US012687632B2

(12) United States Patent
Takahashi et al.

(10) Patent No.: US 12,687,632 B2
(45) Date of Patent: Jul. 21, 2026

(54) OPTICAL MEASUREMENT DEVICE AND OPTICAL MEASUREMENT METHOD

(71) Applicant: HAMAMATSU PHOTONICS K.K., Hamamatsu (JP)

(72) Inventors: Hisanari Takahashi, Hamamatsu (JP); Koyo Watanabe, Hamamatsu (JP); Hiroshi Satozono, Hamamatsu (JP); Takashi Inoue, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 1058 days.

(21) Appl. No.: 17/569,592

(22) Filed: Jan. 6, 2022

(65) Prior Publication Data
US 2022/0236416 A1 Jul. 28, 2022

(30) Foreign Application Priority Data
Jan. 15, 2021 (JP) ................................. 2021-004827

(51) Int. Cl.
| | |
|---|---|
| *G01S 17/26* | (2020.01) |
| *G01S 7/484* | (2006.01) |
| *G01S 7/486* | (2020.01) |

(52) U.S. Cl.
CPC .............. *G01S 17/26* (2020.01); *G01S 7/484* (2013.01); *G01S 7/486* (2013.01)

(58) Field of Classification Search
CPC .............................. G01S 7/48–51; G01J 11/00
See application file for complete search history.

(56) References Cited

U.S. PATENT DOCUMENTS

| | | | |
|---|---|---|---|
| 2002/0130245 A1* | 9/2002 | Fujimoto | ............ C03B 33/0222 |
| | | | 250/205 |
| 2018/0284279 A1* | 10/2018 | Campbell | ............. G01S 7/4817 |
| 2020/0300983 A1* | 9/2020 | Morarity | ............... G01S 7/4865 |

FOREIGN PATENT DOCUMENTS

| | | | |
|---|---|---|---|
| JP | H05-126954 A | | 5/1993 |
| JP | H09101208 A | * | 4/1997 |

(Continued)

OTHER PUBLICATIONS

L. E. Nelson et al., "Ultrashort-pulse fiber ring lasers", Appl. Phys. B 65, 277 (1997) (Year: 1997).*
G. J. Tearney, M. Shishkov, and B. E. Bouma, "Spectrally encoded miniature endoscopy," Opt. Lett. 27, 412-414 (2002) (Year: 2002).*
Xiang Guo, Chang-Ling Zou, and Hong X. Tang, "Second-harmonic generation in aluminum nitride microrings with 2500%/W conversion efficiency," Optica 3, 1126-1131 (2016) (Year: 2016).*
Wikipedia. Retrieved from the internet:<https://en.wikipedia.org/wiki/Laser_diode> (Year: 2019).*

(Continued)

*Primary Examiner* — Yuqing Xiao
*Assistant Examiner* — Sean C. Grant
(74) *Attorney, Agent, or Firm* — Faegre Drinker Biddle & Reath LLP

(57) ABSTRACT

An optical measurement device includes a light pulse source, a light separator unit, a wave synthesizer unit, an optical detection unit, and a measurement unit. The light pulse source outputs a plurality of light pulses having different temporal waveforms and different center wavelengths. The light separator unit spatially separates the light pulses and causes the light pulses to be incident on a measurement object. The wave synthesizer unit synthesizes the light pulses reflected by the measurement object or transmitted through the measurement object and emits the synthesized light pulses onto one optical path. The optical detection unit receives the light pulses emitted from the wave synthesizer unit and outputs a temporal waveform signal of the light pulses. The measurement unit measures timings when the light pulses each are received by the optical detection unit or a difference between the timings on a basis of the temporal waveform signal.

19 Claims, 25 Drawing Sheets

(56)        References Cited

FOREIGN PATENT DOCUMENTS

| | | | | |
|---|---|---|---|---|
| JP | 2002-340689 | A | 11/2002 | |
| JP | 2003078505 | A * | 3/2003 | |
| JP | 2004-138524 | A | 5/2004 | |
| JP | 2008-505344 | A | 2/2008 | |
| JP | 2010-014549 | A | 1/2010 | |
| JP | 2016-050944 | A | 4/2016 | |
| JP | 2017-161292 | A | 9/2017 | |
| JP | 2020-169946 | A | 10/2020 | |
| KR | 20150040398 | A * | 4/2015 | ............ G01S 7/483 |
| WO | 2007/001308 | A2 | 1/2007 | |
| WO | 2019/173898 | A1 | 9/2019 | |

OTHER PUBLICATIONS

Jiang, Y., Karpf, S. & Jalali, B. Time-stretch LiDAR as a spectrally scanned time-of-flight ranging camera. Nat. Photonics 14, 14-18 (2020). (Year: 2020).*

Kim, G.; Park, Y. Independent Biaxial Scanning Light Detection and Ranging System Based on Coded Laser Pulses without Idle Listening Time. Sensors 2018, 18, 2943. (Year: 2018).*

Jiang, Yunshan et al., "Time-stretch LiDAR as a spectrally scanned time-of-flight ranging camera," Nature Photonics vol. 14, Jan. 2020, pp. 14-18.

Office action received from Japanese patent application No. 2021-004827 mailed on Dec. 2, 2025, 5 pages.

\* cited by examiner

OPTICAL MEASUREMENT DEVICE AND OPTICAL MEASUREMENT METHOD

CROSS REFERENCE TO RELATED APPLICATIONS

The present application is based upon and claims the benefit of the priority from Japanese Patent Application No. 2021-004827 filed on Jan. 15, 2021, the entire contents of which are incorporated herein by reference.

TECHNICAL FIELD

The present disclosure relates to an optical measurement device and an optical measurement method.

BACKGROUND

Literature 1 (Yunshan Jiang, Sebastian Karpf, and Bahram Jalali, "Time-stretch LiDAR as a spectrally scanned time-of-flight ranging camera", Nature Photonics 14, pp. 14-18, 2020) discloses a technology for distance measurement. Specifically, a spectroscopic element is used to spatially separate a plurality of light pulses having different wavelengths from a wideband light pulse including a plurality of wavelength components. The plurality of light pulses are emitted toward a plurality of positions on a object at different timings. One light reception element detects light pulses reflected at the plurality of positions on the object. Distance is measured on each of a plurality of positions on the object.

SUMMARY

In a technology disclosed by Literature 1, a plurality of light pulses having different wavelengths are respectively emitted toward a plurality of positions on a object. In that technology, a wavelength of the light pulse radiated toward the object differs depending on each position on the object, but a temporal waveform of the light pulse is the same at any position on the object. Therefore, it is not possible to identify a plurality of light pulses reflected by the object and detected by one light reception element from each other. Therefore, it is not possible to recognize that an order of the light pulses has changed or the light pulses have overlapped during the period from emission of the light pulse toward each of the plurality of positions on the object to detection of the light pulse reflected at each of the plurality of positions on the object. Therefore, it is not possible to correctly identify at which timing a detected light pulse corresponds to a reflected light pulse emitted. As a result, it is not possible to correctly perform distance measurement for each of a plurality of positions on the object.

An object of an embodiment of the present invention is to provide an optical measurement device and an optical measurement method capable of correctly identifying at which timing a detected light pulse corresponds to a reflected light pulse emitted even when an order of the light pulses is changed or the light pulses overlap during the period from emission of the light pulses to detection of the light pulses.

An embodiment of the present invention is an optical measurement device. An optical measurement device includes a measurement light pulse source, a light separator unit, a wave synthesizer unit, an optical detection unit, and a measurement unit. The pulse light source outputs a plurality of measurement light pulses having different temporal waveforms and different center wavelengths. The light separator unit spatially separates the plurality of measurement light pulses for each center wavelength and causes the plurality of measurement light pulses to be incident on a measurement object. The wave synthesizer unit synthesizes the plurality of measurement light pulses reflected by the measurement object or transmitted through the measurement object and emits the synthesized wavelength components onto one optical path. The optical detection unit receives the plurality of measurement light pulses emitted from the wave synthesizer unit and outputs a temporal waveform signal of the plurality of measurement light pulses. The measurement unit measures timings when the plurality of measurement light pulses each are received by the optical detection unit or a difference between the timings on the basis of the temporal waveform signal.

An embodiment of the present invention is an optical measurement method. The optical measurement method includes at least five steps. In a first step, a plurality of measurement light pulses having different temporal waveforms and different center wavelengths are output. In a second step, the plurality of measurement light pulses are spatially separated for each center wavelength and are incident on a measurement object. In a third step, the plurality of measurement light pulses reflected by the measurement object or transmitted through the measurement object are synthesized and emitted onto one optical path. In a fourth step, the plurality of measurement light pulses emitted onto one optical path are received, and a temporal waveform signal of the plurality of measurement light pulses are output. In a fifth step, timings when the plurality of measurement light pulses each are received or a difference between the timings is measured on the basis of the temporal waveform signal.

According to the optical measurement device and the optical measurement method according to the present disclosure, even when an order of the measurement light pulses is changed or the measurement light pulses overlap during the period from emission of the measurement light pulses to detection of the measurement light pulses, it is possible to correctly identify at which timing the detected measurement light pulse corresponds to a measurement light pulse emitted. Therefore, it is possible to correctly perform the measurement using the measurement light pulses.

The present invention will be more fully understood from the detailed description given herein below and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DETAILED DESCRIPTION

Figure 1:
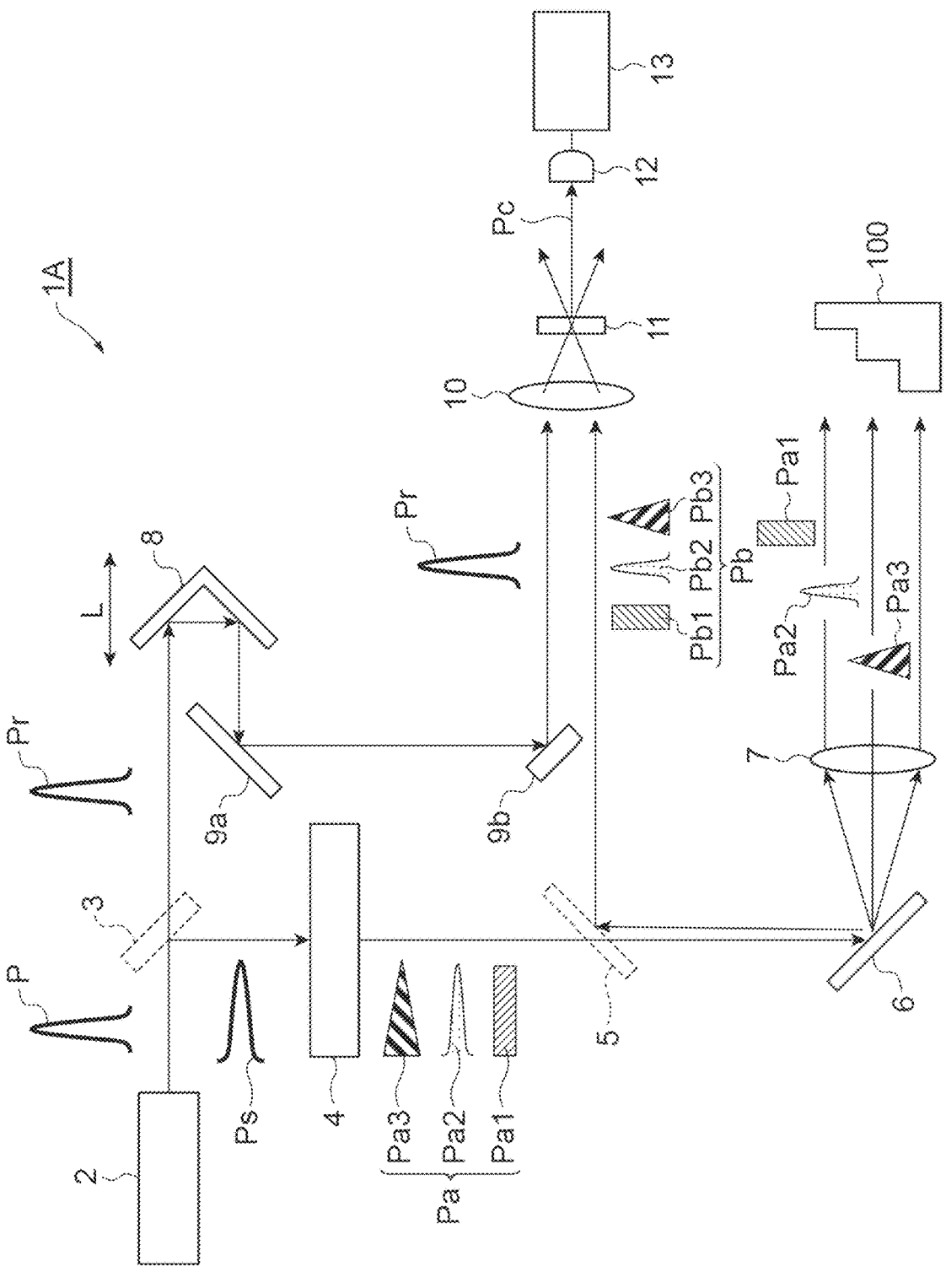
FIG. 1 is a diagram illustrating an example of a configuration of a distance measurement device according to a first embodiment.

Specific examples of an optical measurement device and an optical measurement method according to an embodiment of the present disclosure will be described in detail with reference to the drawings. The present invention is not limited to the embodiments to be described below. A technical scope of the present invention is determined on the basis of description of claims. In the description of the drawings, the same elements are denoted by the same reference numerals, and repeated description will be omitted.

FIG. 1 is a diagram illustrating an example of a configuration of a distance measurement device 1A according to a first embodiment. The distance measurement device 1A includes a pulsed laser light source 2, a beam splitter 3, a pulse forming unit 4, a beam splitter 5, a diffraction grating 6, a lens 7, a moving reflective mirror 8, fixed reflective mirrors 9a and 9b, a lens 10, an optical element 11, an optical detector 12, and a signal processing device 13. The distance measurement device 1A measures a distance to an object 100, which is a measurement object.

The pulsed laser light source 2 outputs a wideband light pulse P. The pulsed laser light source 2 is, for example, a femtosecond laser light source. The pulsed laser light source 2 is, for example, a solid-state laser light source, such as an laser diode (LD) direct excitation type Yb:YAG pulsed laser light source. A temporal waveform of the wideband light pulse P is, for example, a Gaussian function shape. A full width at half maximum (FWHM) of the wideband light pulse P is, for example, 10 fs or more and 10,000 fs or less, and is 100 fs in one example. That is, the wideband light pulse P is a so-called femtosecond light pulse. The wideband light pulse P is a light pulse having a certain wavelength bandwidth and includes a plurality of continuous wavelength components. A bandwidth of the wideband light pulse P is, for example, 10 nm. A center wavelength of the wideband light pulse P is, for example, 1030 nm.

A part of the wideband light pulse P is reflected by the beam splitter 3, becomes a wideband measurement light pulse Ps, and is incident on the pulse forming unit 4. A remaining part of the wideband light pulse P is split from the wideband light pulse P by passing through the beam splitter 3 and becomes a reference light pulse Pr.

The pulse forming unit 4 forms a plurality of measurement light pulses Pa from the wideband measurement light pulse Ps. The plurality of measurement light pulses Pa are a single pulse group generated by dividing a wavelength band of the wideband measurement light pulse Ps into a plurality of wavelength bands and using each of the wavelength bands. The plurality of wavelength bands may have portions that overlap each other near respective boundaries thereof. The plurality of measurement light pulses Pa are also femtosecond light pulses, like the wideband light pulse P.

The plurality of measurement light pulses Pa have different temporal waveforms and different center wavelengths.

The pulsed laser light source 2, the beam splitter 3, and the pulse forming unit 4 constitute a measurement light pulse source that outputs the plurality of measurement light pulses Pa having different temporal waveforms and different center wavelengths.

FIG. 1 illustrates only three measurement light pulses Pa1, Pa2, and Pa3 as individual measurement light pulses included in the plurality of measurement light pulses Pa. However, the number of individual measurement light pulses included in the plurality of measurement light pulses Pa is not limited to 3, and may be any number, for example, 20.

Further, in FIG. 1, a rectangular wave shape, a Gaussian function shape, and a triangular wave shape are schematically illustrated as examples of temporal waveforms of the measurement light pulses Pa1, Pa2, and Pa3 included in the plurality of measurement light pulses Pa. The temporal waveforms of the measurement light pulses Pa1, Pa2, and Pa3 are not limited thereto. The temporal waveform of the measurement light pulses Pa1, Pa2, and Pa3 can be any shape such as a saw wave shape or a multipeak shape. A pulse group, in which a plurality of single pulses having an appropriate temporal waveform such as a Gaussian function shape are successive, may be regarded as one pulse, and the numbers of single pulses included in respective pulse groups are made different from each other so that a plurality of pulses having different temporal waveforms may be formed. For example, a pulse having two successive single pulses, that is, a double pulse, a pulse having three successive pulses, that is, a triple pulse, a pulse having four successive pulses, that is, a quadruple pulse, or the like may be used as pulses having different temporal waveforms.

The plurality of measurement light pulses Pa may have a time interval as illustrated in FIG. 1. In this case, the plurality of measurement light pulses Pa form a measurement light pulse train. The plurality of measurement light pulses Pa may not have a time interval. In this case, the plurality of measurement light pulses Pa overlap each other. When the plurality of measurement light pulses Pa have time intervals, the time intervals may be all the same as illustrated in FIG. 1 or may differ from each other.

Figure 2:
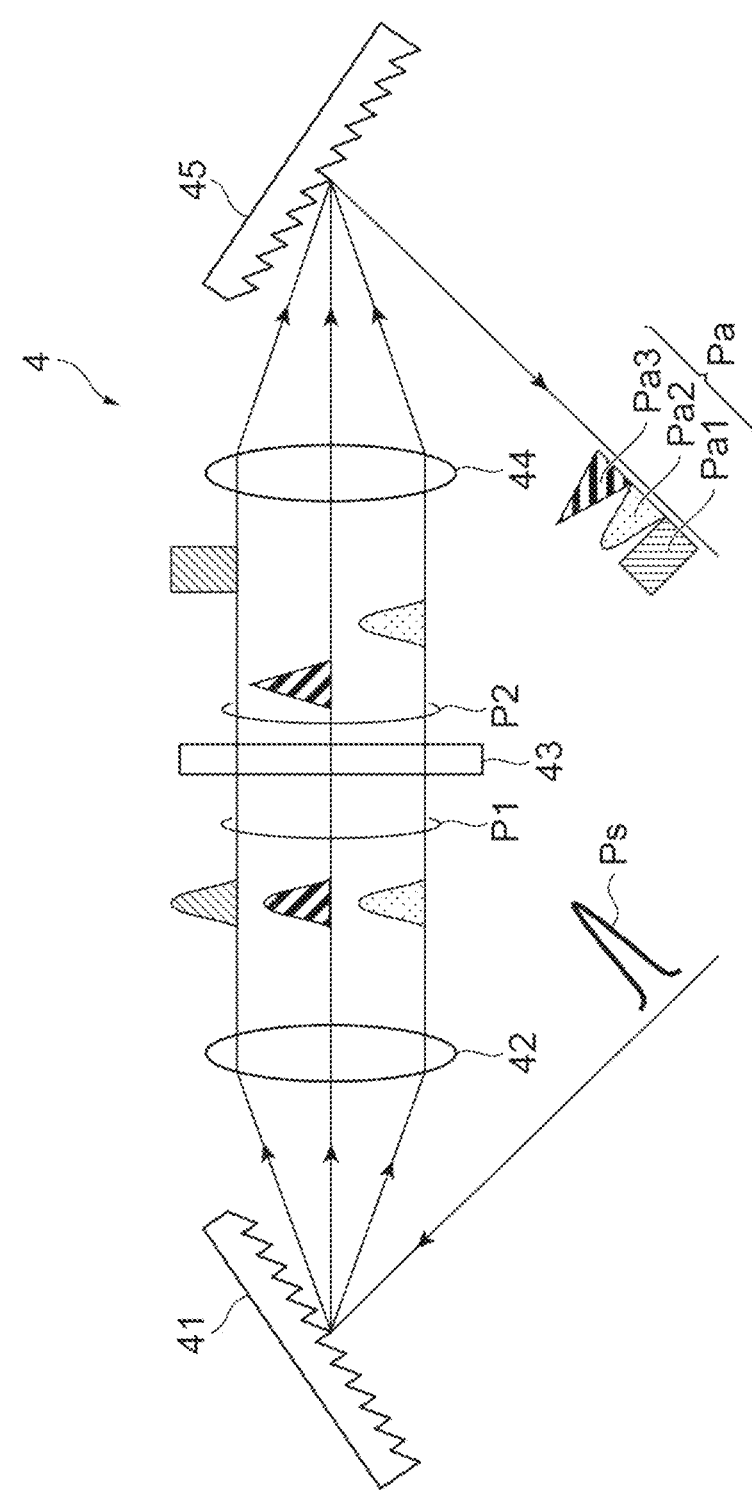
FIG. 2 is a diagram illustrating an example of a configuration of a pulse forming unit of the distance measurement device according to the first embodiment.

FIG. 2 is a diagram illustrating an example of a configuration of the pulse forming unit 4. The pulse forming unit 4 includes a diffraction grating 41, a lens 42, a spatial light modulator (SLM) 43, a lens 44, and a diffraction grating 45.

The diffraction grating 41 is a spectroscopic element and is optically coupled to the pulsed laser light source 2 via the beam splitter 3. The diffraction grating 41 spatially separates a plurality of wavelength components included in the wideband measurement light pulse Ps for each wavelength. Another spectroscopic element such as a prism may be used instead of the diffraction grating 41. The lens 42 collects light P1 including a plurality of wavelength components for each wavelength component and forms an image on a modulation surface of the SLM 43. A concave mirror may be used instead of the lens 42.

The SLM 43 is optically coupled to the diffraction grating 41 via the lens 42. The SLM 43 mutually shifts the phases of the plurality of wavelength components emitted from the diffraction grating 41 in order to convert the wideband measurement light pulse Ps into the plurality of measurement light pulses Pa. For that purpose, the SLM 43 receives a control signal from a control unit (not illustrated) and simultaneously performs phase modulation and intensity modulation of the light P1 including a plurality of wavelength components. The SLM 43 may perform only phase modulation or only intensity modulation. The SLM 43 is of, for example, a phase modulation type, and is a liquid crystal on silicon (LCOS) type in one example. The SLM 43 may be of a transmissive type as illustrated in FIG. 2 or a reflective type.

Figure 3:
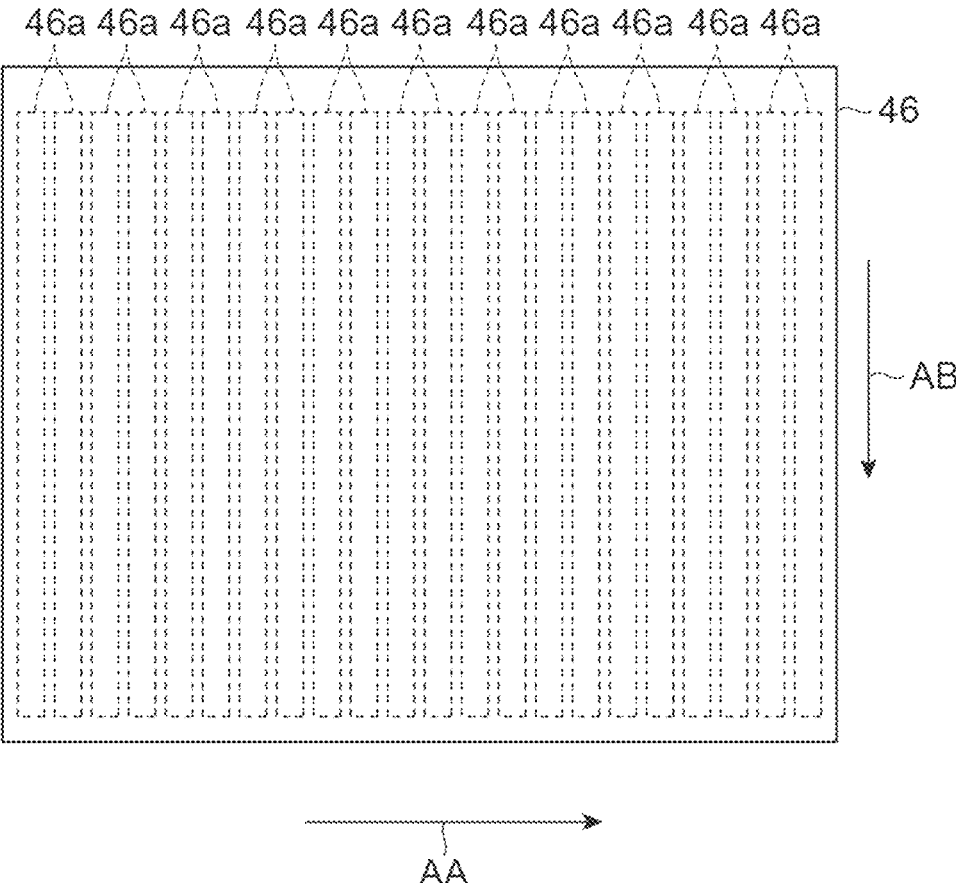
FIG. 3 is a diagram illustrating a modulation surface of a spatial light modulator (SLM) of the distance measurement device according to the first embodiment.

FIG. 3 is a diagram illustrating a modulation surface 46 of the SLM 43. As illustrated in FIG. 3, a plurality of modulation regions 46a are arranged along a direction AA on the modulation surface 46. Each of the plurality of modulation regions 46a extends in a direction AB intersecting the direction AA. The direction AA is a spectral direction of the diffraction grating 41. The modulation surface 46 acts as a Fourier transform plane. Each corresponding wavelength component after spectroscopy is incident on one of the plurality of modulation regions 46a. The SLM 43 modulates a phase and intensity of each incident wavelength component independently of other wavelength components in each of the plurality of modulation regions 46a. Since the SLM 43 of the present embodiment is a phase modulation type, the intensity modulation is realized by a phase pattern, that is, a phase image presented on the modulation surface 46. Details of a modulation method in the SLM 43 will be described below.

FIG. 2 will be referred to again. The lens 44 collects wavelength components of modulated light P2 modulated by the SLM 43 at one point on the diffraction grating 45. The lens 44 functions as a condensing optical system that condenses the modulated light P2. The diffraction grating 45 functions as a synthesizing optical system and synthesizes the wavelength components of the modulated light P2. That is, the lens 44 and the diffraction grating 45 condense and synthesize the plurality of wavelength components of the modulated light P2 with each other to form the plurality of measurement light pulses Pa. A concave mirror may be used instead of the lens 44. Another spectroscopic element such as a prism may be used instead of the diffraction grating 45.

FIG. 1 will be referred to again. The plurality of measurement light pulses Pa formed by the pulse forming unit 4 pass through the beam splitter 5 and are incident on the diffraction grating 6.

The diffraction grating 6 is a spectroscopic element. The diffraction grating 6 spatially separates the measurement light pulses Pa1, Pa2, and Pa3 included in the plurality of incident measurement light pulses Pa for each wavelength. Center wavelengths of the measurement light pulses Pa1, Pa2, and Pa3 are different from each other. Therefore, the measurement light pulses Pa1, Pa2, and Pa3 are diffracted in different directions by the diffraction grating 6 and are spatially separated from each other. The lens 7 condenses the measurement light pulses Pa1, Pa2, and Pa3 spatially separated from each other for each pulse and irradiates different positions on the surface of the object 100 with the measurement light pulses Pa1, Pa2, and Pa3. The diffraction grating 6 and the lens 7 form a light separator unit which spatially separates the measurement light pulses Pa1, Pa2, and Pa3 included in the plurality of measurement light pulses Pa from each other for each center wavelength and causes the measurement light pulses Pa1, Pa2, and Pa3 to be incident on the object 100. Another spectroscopic element such as a prism may be used instead of the diffraction grating 6. A concave mirror may be used instead of the lens 7.

At least parts of the measurement light pulses Pa1, Pa2, and Pa3 radiated onto the surface of the object 100 at the different positions are reflected by the surface of the object 100 and become reflected light pulses Pb1, Pb2, and Pb3, respectively.

The lens 7 collects the reflected light pulses Pb1, Pb2, and Pb3 at one point on the diffraction grating 6. The lens 7 functions as a condensing optical system that condenses the reflected light pulses Pb1, Pb2, and Pb3. The diffraction grating 6 functions as a synthesizing optical system. The diffraction grating 6 synthesizes the reflected light pulses Pb1, Pb2, and Pb3 and emits the synthesized light pulses as the plurality of reflected light pulses Pb toward the beam splitter 5. The lens 7 and the diffraction grating 6 form a wave synthesizer unit which condenses and synthesizes the reflected light pulses Pb1, Pb2, and Pb3 with each other and emits the synthesized light pulses Pb1, Pb2, and Pb3 as the plurality of reflected light pulses Pb toward the beam splitter 5.

Since the plurality of measurement light pulses Pa are femtosecond light pulses, the plurality of reflected light pulses Pb are also typically femtosecond light pulses. Further, since the plurality of measurement light pulses Pa have different temporal waveforms and different center wavelengths, the plurality of reflected light pulses Pb also have different temporal waveforms and different center wavelengths.

The plurality of measurement light pulses Pa may form a measurement light pulse train or may overlap each other, as described above. The same applies to the plurality of reflected light pulses Pb, but typically, the reflected light pulses Pb1, Pb2, and Pb3 are pulses reflected at different timings depending on the surface of the object 100. Therefore, the plurality of reflected light pulses Pb have a time interval and constitute a reflected light pulse train.

The plurality of reflected light pulses Pb are reflected by the beam splitter 5 and incident on the lens 10.

The distance measurement device 1A is configured so that the reflected light pulses Pb1, Pb2, and Pb3 travel in opposite directions in the same optical path to the measurement light pulses Pa1, Pa2, and Pa3 corresponding thereto. The diffraction grating 6 and the lens 7 are shared between both of the light separator unit which spatially separates the measurement light pulses Pa1, Pa2, and Pa3 included in the plurality of measurement light pulses Pa and irradiates the object 100 with the measurement light pulses Pa1, Pa2, and Pa3, and the wave synthesizer unit which condenses and synthesizes the reflected light pulses Pb1, Pb2, and Pb3 with each other and emits the synthesized light pulses Pb1, Pb2, and Pb3 as the plurality of reflected light pulses Pb toward the beam splitter 5. The reflected light pulses Pb1, Pb2, and Pb3 may travel through a different optical path from the measurement light pulses Pa1, Pa2, and Pa3 corresponding thereto, and the light separator unit and the wave synthesizer unit may be configured separately.

The reference light pulse Pr is sequentially reflected by the moving reflective mirror 8 and the fixed reflective mirrors 9a and 9b, and is incident on the lens 10. At least one of the moving reflective mirror 8 and the fixed reflective mirrors 9a and 9b (the moving reflective mirror 8 in the example illustrated in FIG. 1) is mounted on a moving stage (not illustrated), and is movable in an optical axis direction indicated by an arrow L in FIG. 1. Accordingly, an optical path length of the reference light pulse Pr is made variable.

The lens 10 condenses each of the plurality of reflected light pulses Pb and the reference light pulse Pr toward the optical element 11, and causes an optical axis of the plurality of reflected light pulses Pb to intersect an optical axis of the reference light pulse Pr at a predetermined angle in the optical element 11.

The optical element 11 includes, for example, a nonlinear optical crystal that generates a second harmonic (SHG).

Examples of the nonlinear optical crystal may include a KTP (KTiOPO$_4$) crystal, an LBO (LiB$_3$O$_5$) crystal, and a BBO ($\beta$-BaB$_2$O$_4$) crystal.

In the optical element 11 including a nonlinear optical crystal, the optical axis of the plurality of reflected light pulses Pb intersect the optical axis of the reference light pulse Pr at a predetermined angle. Therefore, when the plurality of reflected light pulses Pb and the reference light pulses Pr are incident on the optical element 11, a second harmonic Pc is generated with an intersection of the optical axes of both as a starting point. The second harmonic Pc is correlated light including a cross-correlation between the plurality of reflected light pulses Pb and the reference light pulse Pr. The moving reflective mirror 8, the fixed reflective mirrors 9a and 9b, the lens 10, and the optical element 11 constitute a correlation optical system that outputs the correlated light including a cross-correlation between the plurality of reflected light pulses Pb and the reference light pulse Pr.

The second harmonic Pc generated in the optical element 11 is collimated or condensed by a lens (not illustrated) and then incident on the optical detector 12. The optical detector 12 receives the second harmonic Pc, converts the second harmonic Pc into an electrical signal, and outputs the electrical signal. The optical detector 12 is, for example, a photodiode or a photomultiplier tube.

The second harmonic is generated in the optical element 11 including the nonlinear optical crystal when both the plurality of reflected light pulses Pb and the reference light pulse Pr are incident on the optical element 11. Therefore, the second harmonic Pc generated in the optical element 11 corresponds to an optical signal obtained by sampling temporal waveforms of the plurality of reflected light pulses Pb at a timing when the reference light pulse Pr is incident on the optical element 11.

In the distance measurement device 1A, the optical path length of the reference light pulse Pr is variable. Therefore, a difference can be provided between a timing when the plurality of reflected light pulses Pb are incident on the optical element 11 and a timing when the reference light pulse Pr is incident on the optical element 11, and the difference can be changed. Thus, the wideband light pulse P is repeatedly output from the pulsed laser light source 2 at a fixed period, and the plurality of reflected light pulses Pb are repeatedly generated at the fixed period. At that time, the optical path length of the reference light pulse Pr is set to a predetermined length. Accordingly, it is possible to receive the second harmonic Pc generated at a predetermined timing during a period in the optical element 11 using the optical detector 12, convert the second harmonic Pc into an electrical signal, and output the electrical signal. Therefore, by repeatedly detecting the second harmonic Pc generated in the optical element 11 using the optical detector 12 while changing the optical path length of the reference light pulse Pr, it is possible to sequentially acquire an electrical signal corresponding to an optical signal obtained by sampling the temporal waveforms of the plurality of reflected light pulses Pb at different timings. The signal processing device 13 measures the temporal waveforms of the plurality of reflected light pulses Pb by processing the electrical signals sequentially acquired in this way.

Normally, it is possible to measure a temporal waveform of a light pulse on the basis of a temporal waveform of an electrical signal output by an optical detector that directly receives the light pulse, such as a photodiode or a photomultiplier tube. However, a response speed of the optical detector is limited. For that reason, as a pulse width of the light pulse becomes smaller, the temporal waveform of the electrical signal output by the optical detector does not accurately reflect the temporal waveform of the light pulse. Because of that, it is not possible to accurately measure a temporal waveform of a light pulse having a narrow pulse width, such as a femtosecond light pulse depending on the temporal waveform of the electrical signal output by the optical detector that directly receives the light pulse. Thus, in the distance measurement device 1A, the temporal waveform of the light pulse is measured by using an optical sampling technology using a correlation optical system is used, as described above.

The correlation optical system including the moving reflective mirror 8, the fixed reflective mirrors 9a and 9b, the lens 10, and the optical element 11, and the optical detector 12, and the signal processing device 13 constitute an optical detection unit which receives the plurality of reflected light pulses Pb and outputs a temporal waveform signal thereof. The signal processing device 13 forms a measurement unit which measures timings when the plurality of reflected light pulses Pb are received or a difference between the timings on the basis of the temporal waveform signal of the plurality of reflected light pulses Pb.

The reflected light pulses Pb1, Pb2, and Pb3 included in the plurality of reflected light pulses Pb have different temporal waveforms. Therefore, the reflected light pulses Pb1, Pb2, and Pb3 can be identified on the basis of the temporal waveforms of the plurality of reflected light pulses Pb. Even when an order of the reflected light pulses Pb1, Pb2, and Pb3 is changed or the reflected light pulses Pb1, Pb2, and Pb3 overlap each other until the plurality of reflected light pulses Pb are incident on the optical element 11, it is possible to identify that the reflected light pulses Pb1, Pb2, and Pb3 are reflected light pulses corresponding to the respective measurement light pulses Pa1, Pa2, and Pa3.

Figure 4:
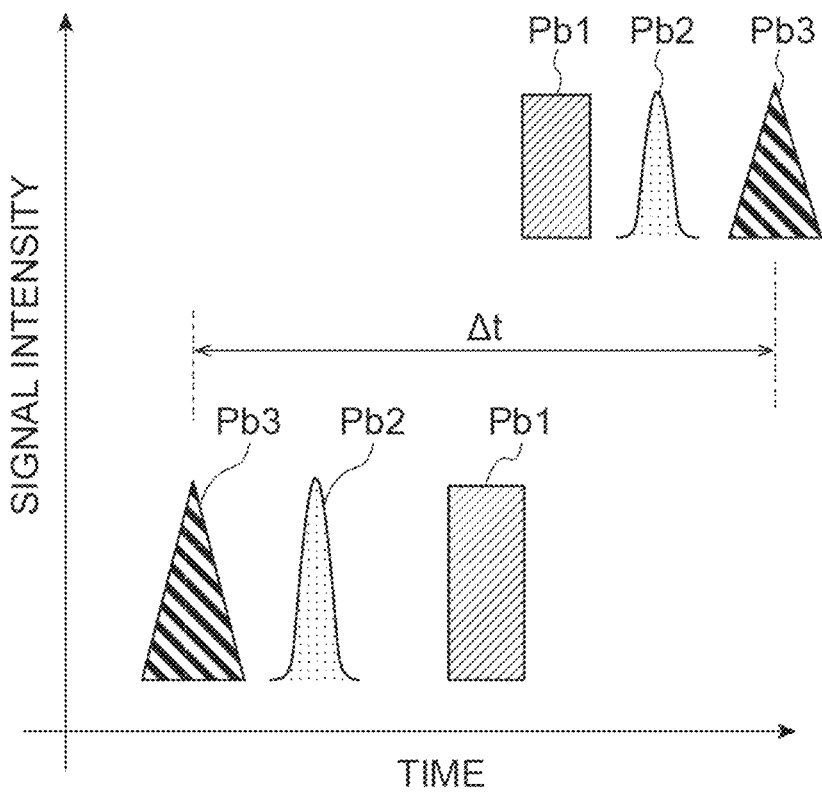
FIG. 4 is a diagram schematically illustrating an example of temporal waveforms of a plurality of reflected light pulses measured by the distance measurement device according to the first embodiment.

Hereinafter, an example of a procedure for measuring the distance to the object 100 using the distance measurement device 1A will be described with reference to FIGS. 1 and 4. FIG. 4 is a diagram schematically illustrating an example of the temporal waveforms of the plurality of reflected light pulses Pb measured by the distance measurement device 1A.

First, a reference object is prepared. As the reference object, for example, a flat plate having a flat surface can be used. It is assumed that a distance to the reference object is known.

Then, the distance measurement device 1A irradiates the reference object with the plurality of measurement light pulses Pa, and measures the temporal waveforms of the plurality of reflected light pulses Pb. An example of the temporal waveforms of the plurality of reflected light pulses Pb obtained from the reference object is schematically illustrated in an upper part of FIG. 4. Since the reflected light pulses Pb1, Pb2, and Pb3 have different temporal waveforms, the reflected light pulses Pb1, Pb2, and Pb3 can be identified on the basis of the temporal waveforms of the plurality of reflected light pulses Pb.

As illustrated in FIG. 1, it is assumed that the plurality of measurement light pulses Pa form a measurement light pulse train, and the measurement light pulses Pa1, Pa2, and Pa3 are arranged in this order. In this case, the measurement light pulses Pa1, Pa2, and Pa3 are incident on the surface of the reference object in different positions in this order. The reference object is a flat plate having a flat surface. Therefore, the measurement light pulses Pa1, Pa2, and Pa3 are reflected in an order of incidence and become the reflected light pulses Pb1, Pb2, and Pb3. Then, the plurality of reflected light pulses Pb forms a reflected light pulse train, and the reflected light pulses Pb1, Pb2, and Pb3 are always arranged in this order. For that reason, when the temporal waveforms of the plurality of reflected light pulses Pb are measured, a temporal waveform of the reflected light pulse Pb1 first appears, and then a temporal waveform of the reflected light pulse Pb2 and a temporal waveform of the reflected light pulse Pb3 sequentially appear, for example, as schematically illustrated in the upper part of FIG. 4. That is, when the reference object is a flat plate having a flat surface, it is also possible to identify the temporal waveforms of the reflected light pulses Pb1, Pb2, and Pb3 on the basis of an order in which the reflected light pulses Pb1, Pb2, and Pb3 appear.

Then, the distance measurement device 1A irradiates the object 100 as a measurement object with the plurality of measurement light pulses Pa, and measures the temporal waveforms of the plurality of reflected light pulses Pb. An example of the temporal waveforms of the plurality of reflected light pulses Pb obtained from the object 100 is schematically illustrated in a lower part of FIG. 4.

For example, when the distance to the object 100 is smaller than the distance to the reference object, a timing when the temporal waveforms of the plurality of reflected light pulses Pb appear is earlier than that of the reference object. Further, for example, when it is assumed that the object 100 is not a flat plate having a flat surface and the distance to the object 100 differs for each position on the surface of the object 100 as illustrated in FIG. 1, degrees to which timings when the temporal waveforms of the reflected light pulses Pb1, Pb2, and Pb3 appear earlier differ from each other. This is because the reflected light pulses Pb1, Pb2, and Pb3 are generated by the measurement light pulses Pa1, Pa2, and Pa3 radiated onto the surface of the object 100 in different positions, that is, in positions at different distances being reflected by the surface of the object 100. For example, in the example illustrated in FIG. 1, the measurement light pulse Pa3 is located at the end of the measurement light pulse train including the plurality of measurement light pulses Pa, but is radiated to a position with the shortest distance on the surface of the object 100, and thus, there is a possibility that the measurement light pulse Pa3 may be reflected and become the reflected light pulse Pb3 at a timing earlier than other measurement light pulses. In this case, the reflected light pulse Pb3 is located at a head of the reflected light pulse train including the plurality of reflected light pulses Pb. When the temporal waveforms of the plurality of reflected light pulses Pb are measured, the temporal waveforms of the plurality of reflected light pulses Pb generally appear at an earlier timing than a temporal waveform schematically illustrated in an upper side of FIG. 4, for example, as schematically illustrated in the lower part of FIG. 4. Further, an order in which the temporal waveforms of the reflected light pulses Pb1, Pb2, and Pb3 appear may differ from an order in which the measurement light pulses Pa1, Pa2, and Pa3 that cause the reflected light pulses Pb1, Pb2, and Pb3 are arranged.

The reflected light pulses Pb1, Pb2, and Pb3 have different temporal waveforms. Therefore, it is possible to identify the reflected light pulses Pb1, Pb2, and Pb3 on the basis of the temporal waveforms of the plurality of reflected light pulses Pb regardless of whether the order in which the reflected light pulses Pb1, Pb2, and Pb3 appear in the temporal waveform matches or differs from the order in which the measurement light pulses Pa1, Pa2, and Pa3 are arranged. Then, when the temporal waveforms of the plurality of reflected light pulses Pb obtained from the reference object are compared with the temporal waveforms of the plurality of reflected light pulses Pb obtained from the object 100, it is possible to measure a difference in a timing when a temporal waveform of a specific reflected light pulse (for example, the reflected light pulse Pb3) appears between the reference object and the object 100. For example, it is assumed that, as illustrated in FIG. 4, a timing when the temporal waveform of the reflected light pulse Pb3 appears in the temporal waveforms of the plurality of reflected light pulses Pb obtained from the object 100 is Δt earlier than a timing when the temporal waveform of the reflected light pulse Pb3 appears in the temporal waveforms of the plurality of reflected light pulses Pb obtained from the reference object. In this case, Δt has a magnitude corresponding to a difference obtained by subtracting, from the distance to the reference object in a position in which the measurement light pulse Pa3 is incident, the distance to the object 100 in the same position. The distance to the reference object is known. Since the reference object is a flat plate having a flat surface, the distance to the reference object is the same regardless of a position on the surface of the reference object. Therefore, it is possible to calculate the distance to the object 100 at the position on the basis of Δt.

When the distance to the object 100 is larger than the distance to the reference object, the timing when the temporal waveform of the reflected light pulse Pb3 appears is not brought forward by Δt, but is delayed. In this case, Δt is an amount corresponding to a difference obtained by subtracting the distance to the reference object from the distance to the object 100. It is still possible to calculate the distance to the object 100 on the basis of Δt.

Figure 5:
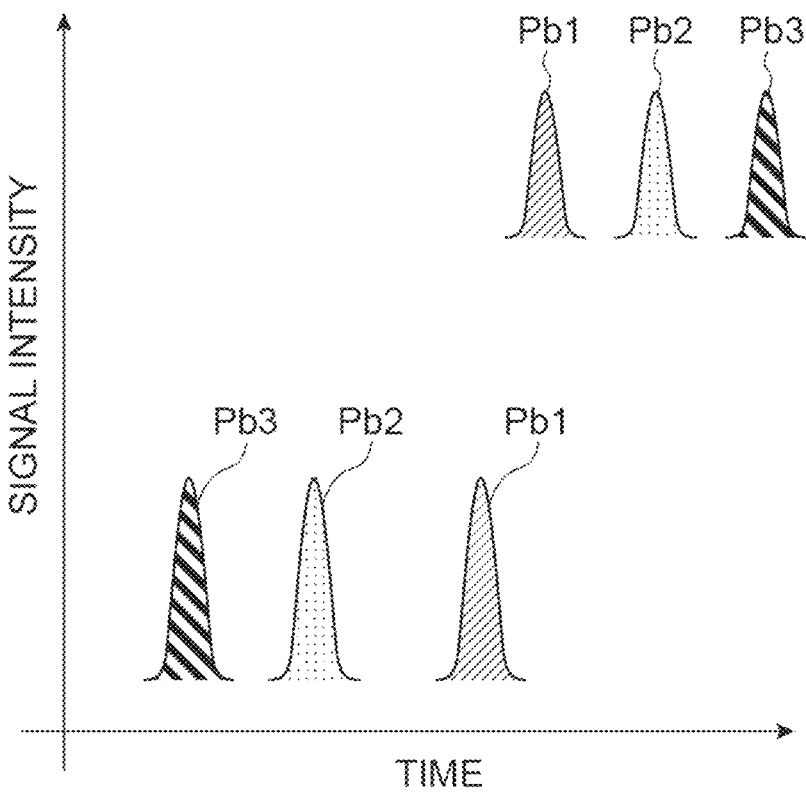
FIG. 5 is a diagram schematically illustrating an example of temporal waveforms of a plurality of reflected light pulses measured by a distance measurement device according to a comparative example.

FIG. 5 is a diagram schematically illustrating an example of temporal waveforms of a plurality of reflected light pulses Pb measured by a distance measurement device according to a comparative example.

A configuration of the distance measurement device according to the comparative example is the same as that of the distance measurement device 1A according to the first embodiment except that the temporal waveforms of the plurality of measurement light pulses Pa are the same (for example, all have a Gaussian function shape). In the distance measurement device according to the comparative example, since the temporal waveforms of the plurality of measurement light pulses Pa are the same as each other, the temporal waveforms of the plurality of reflected light pulses Pb are also the same as each other (for example, all have a Gaussian function shape). An example of the temporal waveforms of the plurality of reflected light pulses Pb obtained from the reference object by the distance measurement device according to the comparative example is schematically illustrated in an upper part of FIG. 5. An example of the temporal waveforms of the plurality of reflected light pulses Pb obtained from the object 100 by the distance measurement device according to the comparative example is schematically illustrated in a lower part of FIG. 5.

Even in a case in which the distance measurement device according to the comparative example is used, when the reference object is a flat plate having a flat surface, the reflected light pulses Pb1, Pb2, and Pb3 included in the plurality of reflected light pulses Pb obtained from the reference object can be identified. As described above, it is assumed that the plurality of measurement light pulses Pa form a measurement light pulse train, and the measurement light pulses Pa1, Pa2, and Pa3 are arranged in this order, as illustrated in FIG. 1. In this case, the measurement light pulses Pa1, Pa2, and Pa3 are incident on the surface of the reference object in different positions in this order and are reflected in this order to become the reflected light pulses Pb1, Pb2, and Pb3. Therefore, the reflected light pulses Pb1, Pb2, and Pb3 included in the plurality of reflected light pulses Pb are always arranged in this order. That is, the temporal waveforms of the reflected light pulses Pb1, Pb2, and Pb3 appear in this order in the temporal waveforms of the plurality of reflected light pulses Pb, as schematically illustrated in the upper portion of FIG. 5. Because of that, even when the temporal waveforms of the plurality of reflected light pulses Pb are the same as each other, the temporal waveforms of the reflected light pulses Pb1, Pb2, and Pb3 can be identified on the basis of an order in which these appear.

On the other hand, the reflected light pulses Pb1, Pb2, and Pb3 included in the plurality of reflected light pulses Pb obtained from the object 100 cannot be identified. Generally, the surface of the object 100 is not flat, and the measurement light pulses Pa1, Pa2, and Pa3 are reflected at different timings in different positions on the surface of the object 100 and become the reflected light pulses Pb1, Pb2, and Pb3. Therefore, even when the plurality of measurement light pulses Pa form a measurement light pulse train and the measurement light pulses Pa1, Pa2, and Pa3 are arranged in this order, an order in which the temporal waveforms of the reflected light pulses Pb1, Pb2, and Pb3 appear may differ from an order in which the measurement light pulses Pa1, Pa2, and Pa3 causing the reflected light pulses Pb1, Pb2, and Pb3 to be generated are arranged. In such a case, the reflected light pulses Pb1, Pb2, and Pb3 cannot be distinguished from each other on the basis of temporal waveforms thereof, as schematically illustrated in a lower portion of FIG. 5. Further, the reflected light pulses Pb1, Pb2, and Pb3 cannot be identified from each other on the basis of the order in which the reflected light pulses Pb1, Pb2, and Pb3 appear.

As described above, the distance measurement device 1A according to the first embodiment causes the plurality of measurement light pulses Pa having different temporal waveforms and different center wavelengths to be incident on the object 100 which is a measurement object. Because of that, even when the order of the reflected light pulses Pb1, Pb2, and Pb3 included in the plurality of reflected light pulses Pb is changed, or the reflected light pulses Pb1, Pb2, and Pb3 overlap each other, the reflected light pulses Pb1, Pb2, and Pb3 can be identified correctly. Therefore, it is possible to measure the distance to the object 100 correctly.

Although the temporal waveforms of the plurality of reflected light pulses Pb from the reference object are first measured, and then the temporal waveforms of the plurality of reflected light pulses Pb from the object 100 are measured in the above description, it is also possible to simultaneously measure the temporal waveforms of the reflected light pulses from the reference object and the object 100. That is, since the plurality of measurement light pulses Pa radiated by the distance measurement device 1A are spatially separated from each other, it is possible to simultaneously irradiate the reference object with some (for example, the measurement light pulse Pa1) of the measurement light pulses included in the plurality of measurement light pulses Pa and the object 100 with the remainder (for example, the measurement light pulses Pa2 and Pa3). In this case, it is possible to measure the distance to the object 100 on the basis of a time difference between a timing when the temporal waveform of the reflected light pulse P131 from the reference object appears and a timing when the temporal waveforms of the reflected light pulses Pb2 and Pb3 from the object 100 appear.

The distance measurement device 1A according to the first embodiment can also be used for measurement of the thickness of the object 100. Hereinafter, an example of a procedure for measuring the thickness of the object 100 using the distance measurement device 1A will be described with reference to FIGS. 1 and 4.

First, a reference object having a known thickness is prepared and the reference object is placed on a sample table, for example. As the reference object having a known thickness, for example, a flat plate having a known uniform thickness can be used. Hereinafter, a case in which the reference object will be described as the flat plate having a known uniform thickness will be described, but the reference object is not limited thereto. Even when a thickness of an object is not uniform, the object can be used as the reference object as long as the thickness is known in each position on a surface of the object.

Then, the distance measurement device 1A irradiates the reference object with the plurality of measurement light pulses Pa, and measures the temporal waveforms of the plurality of reflected light pulses Pb. An example of the temporal waveforms of the plurality of reflected light pulses Pb obtained from the reference object is schematically illustrated in the upper part of FIG. 4.

Then, the object 100 as a measurement object is placed on the sample table instead of the reference object, and the distance measurement device 1A irradiates the object 100 with the plurality of measurement light pulses Pa, and measures the temporal waveforms of the plurality of reflected light pulses Pb. An example of the temporal waveforms of the plurality of reflected light pulses Pb obtained from the object 100 is schematically illustrated in the lower part of FIG. 4.

For example, when the thickness of the object 100 is larger than that of the reference object, the timing when the temporal waveforms of the plurality of reflected light pulses Pb appear is earlier than that of the reference object. Further, for example, when it is assumed that the thickness of the object 100 differs for each position on the surface of the object 100 as illustrated in FIG. 1, degrees to which timings when the temporal waveforms of the reflected light pulses Pb1, Pb2, and Pb3 appear are earlier differs from each other. Therefore, when the temporal waveforms of the plurality of reflected light pulses Pb are measured, the temporal waveforms of the plurality of reflected light pulses Pb generally appear at a timing earlier than the temporal waveforms schematically illustrated in the upper part of FIG. 4, as schematically illustrated in the lower part of FIG. 4. The order in which the temporal waveforms of the reflected light pulses Pb1, Pb2, and Pb3 appear may differ from an order of the measurement light pulses Pa1, Pa2, and Pa3 that cause the reflected light pulses Pb1, Pb2, and Pb3 are arranged.

A subsequent process is the same as that in the distance measurement. That is, the temporal waveforms of the plurality of reflected light pulses Pb obtained from the reference object are compared with the temporal waveforms of the plurality of reflected light pulses Pb obtained from the object 100. For the specific reflected light pulse (for example, the reflected light pulse Pb3), a difference in a timing when the temporal waveform of the reflected light pulse appears between the reference object and the object 100 is measured. For example, it is assumed that, as illustrated in FIG. 4, the timing when the temporal waveform of the reflected light pulse Pb3 appears in the temporal waveforms of the plurality of reflected light pulses Pb obtained from the object 100 is $\Delta t$ earlier than the timing when the temporal waveform of the reflected light pulse Pb3 appears in the temporal waveforms of the plurality of reflected light pulses Pb obtained from the reference object. In this case, $\Delta t$ has a magnitude corresponding to a difference obtained by subtracting, from a thickness of the object 100 in the position in which the measurement light pulse Pa3 is incident, a thickness of the reference object in the same position. Since the thickness of the reference object in the position is known, it is possible to calculate the thickness of the object 100 at the position on the basis of $\Delta t$.

When the thickness of the object 100 is smaller than the thickness of the reference object, the timing when the temporal waveform of the reflected light pulse Pb3 appears is not brought forward by $\Delta t$, but is delayed on the contrary. In this case, it is possible to still calculate the thickness of the object 100 on the basis of $\Delta t$.

Figure 6:
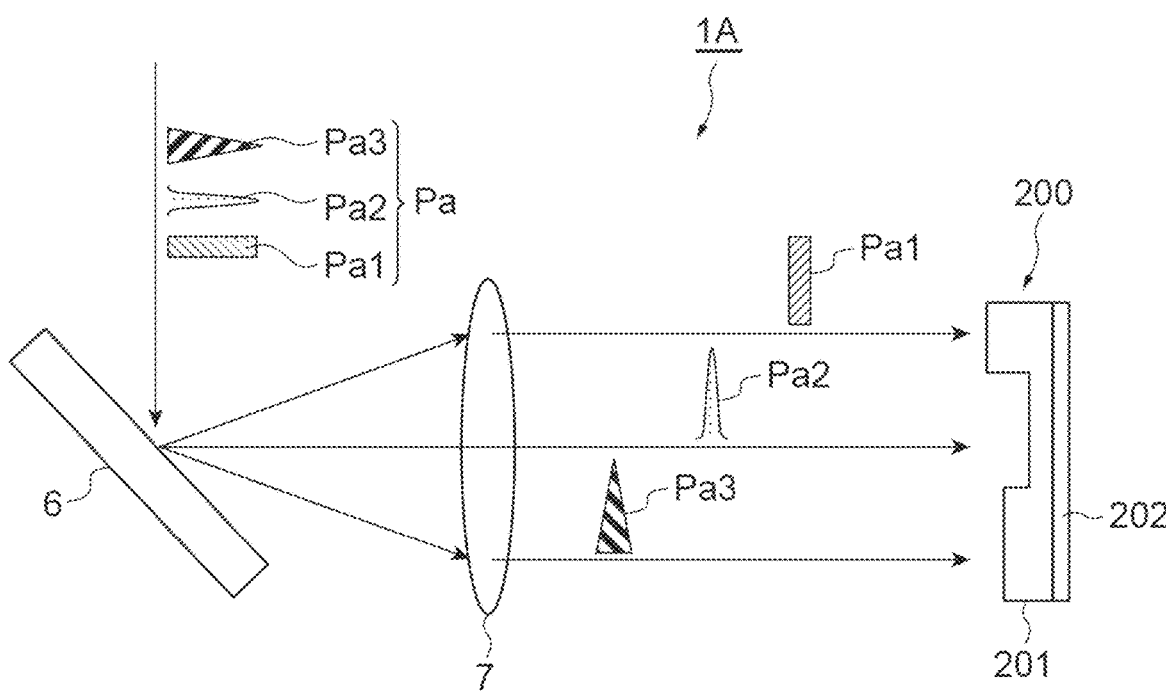
FIG. 6 is a diagram illustrating a part of the configuration of the distance measurement device according to the first embodiment.
Figure 7:
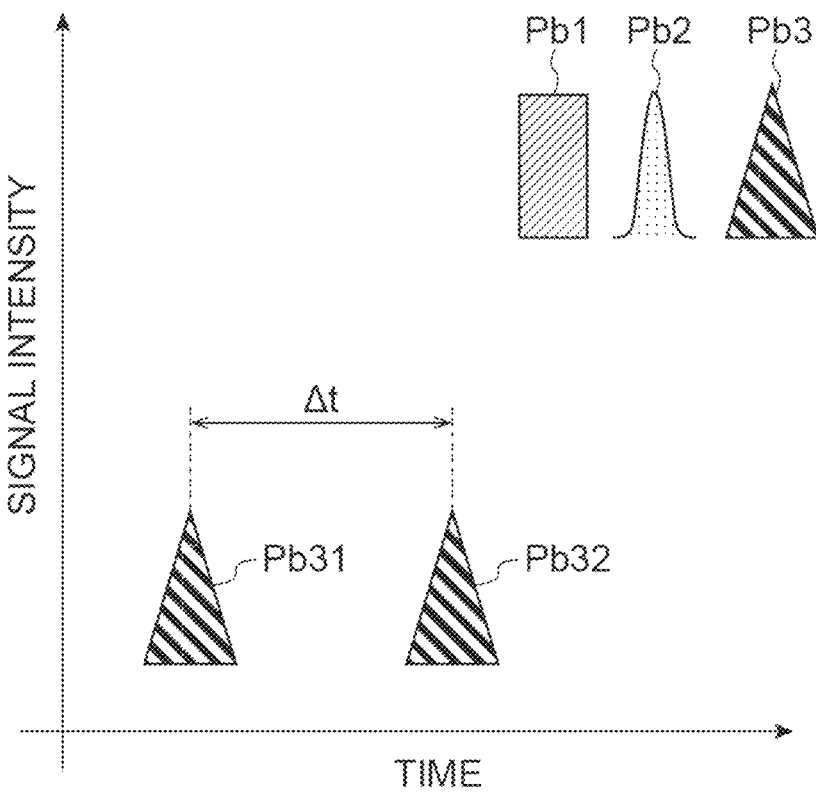
FIG. 7 is a diagram schematically illustrating an example of temporal waveforms of a plurality of reflected light pulses measured by the distance measurement device according to the first embodiment.

The distance measurement device 1A according to the first embodiment can also be used for measurement of a film thickness. Hereinafter, an example of a procedure for measuring the film thickness using the distance measurement device 1A will be described with reference to FIGS. 6 and 7. FIG. 6 is a diagram illustrating a part of the configuration of the distance measurement device 1A illustrated in FIG. 1. FIG. 7 is a diagram schematically illustrating an example of the temporal waveforms of the plurality of reflected light pulses Pb measured by the distance measurement device 1A.

As illustrated in FIG. 6, the distance measurement device 1A irradiates a multilayer film structure 200 as a measurement object with the plurality of measurement light pulses Pa, and measures the temporal waveforms of the plurality of reflected light pulses Pb.

The multilayer film structure 200 includes a thin film 201. The thin film 201 is formed on a surface of the substrate 202. The substrate 202 is, for example, a flat plate having a uniform thickness, but is not limited thereto. A thickness of the thin film 201 may be uniform, or may differ for each position on the surface of the thin film 201 as illustrated in FIG. 6. In the multilayer film structure 200 illustrated in FIG. 6, the thin film 201 formed on the surface of the substrate 202 is only one layer. However, the number of layers of the thin film 201 is not limited to one, and can be any number.

The measurement light pulses Pa1, Pa2, and Pa3 radiated onto a surface of the multilayer film structure 200 in different positions are not only reflected by the surface of the thin film 201, but also pass through the thin film 201, reach the surface of the substrate 202, and are reflected by the surface of the substrate 202. That is, a plurality of reflected light pulses are generated from each of the plurality of measurement light pulses Pa radiated to the multilayer film structure 200. For example, as schematically illustrated in a lower part of FIG. 7, a part of the measurement light pulse Pa3 is reflected by the surface of the thin film 201 to become a first reflected light pulse Pb31, and a further part of the remaining part is transmitted through the thin film 201 and then reflected by the surface of the substrate 202 to become a second reflected light pulse Pb32. Although not illustrated in a lower part of FIG. 7, a first reflected light pulse and a second reflected light pulse are also generated from each of the measurement light pulses Pa1 and Pa2.

An upper part of FIG. 7 is a diagram illustrating an example of the temporal waveforms of the plurality of reflected light pulses Pb obtained from the reference object (a flat plate having a known uniform thickness), and description thereof will be omitted since the upper part is the same as the upper part of FIG. 4.

In general, a light pulse radiated to a multilayer structure including a substrate and a multi-layer thin film formed on the substrate is not only reflected by a surface of a thin film of the uppermost layer and a surface of the substrate, but also reflected by an interface between the thin film and the thin film. When the number of layers of the thin film is N, N+1 reflected light pulses are generated. Therefore, the plurality of measurement light pulses Pa are incident on the surface of the multilayer film structure 200 in different positions, and the number of reflected light pulses (for example, the first reflected light pulse Pb31 and the second reflected light pulse Pb32) generated from the measurement light pulse (for example, the measurement light pulse Pa3) incident at a certain position is counted, so that the number of layers of the thin film 201 at the position can be examined.

In addition, the thickness of the thin film 201 in the position in which the measurement light pulse Pa3 is incident can be calculated on the basis of Δt in the temporal waveforms of the plurality of reflected light pulses Pb and a known refractive index of the thin film 201. Δt is a difference between a timing when the temporal waveform of the first reflected light pulse Pb31 appears, and a timing when the temporal waveform of the second reflected light pulse Pb32 appears. The first reflected light pulse Pb31 is a light pulse reflected by the surface of the thin film 201. The second reflected light pulse Pb32 is a light pulse reflected by the surface of the substrate 202.

When the thickness of the thin film 201 is known, it is possible to calculate the refractive index of the thin film 201 on the basis of the timing difference Δt. That is, the distance measurement device 1A according to the first embodiment can also be used for measurement of the refractive index.

A modulation method for converting the wideband measurement light pulse Ps, which is a single pulse, into the plurality of measurement light pulses Pa in the SLM 43 of the pulse forming unit 4 illustrated in FIG. 2 will be described in detail. A domain before the lens 44, that is, a spectral domain, and a domain after the diffraction grating 45, that is, a time domain, are in a Fourier transform relationship. Phase modulation in the spectral domain affects the temporal intensity waveform in the time domain. Therefore, output light from the pulse forming unit 4 can have various temporal intensity waveforms different from the wideband measurement light pulse Ps according to a modulation pattern of the SLM 43.

Figure 8A:
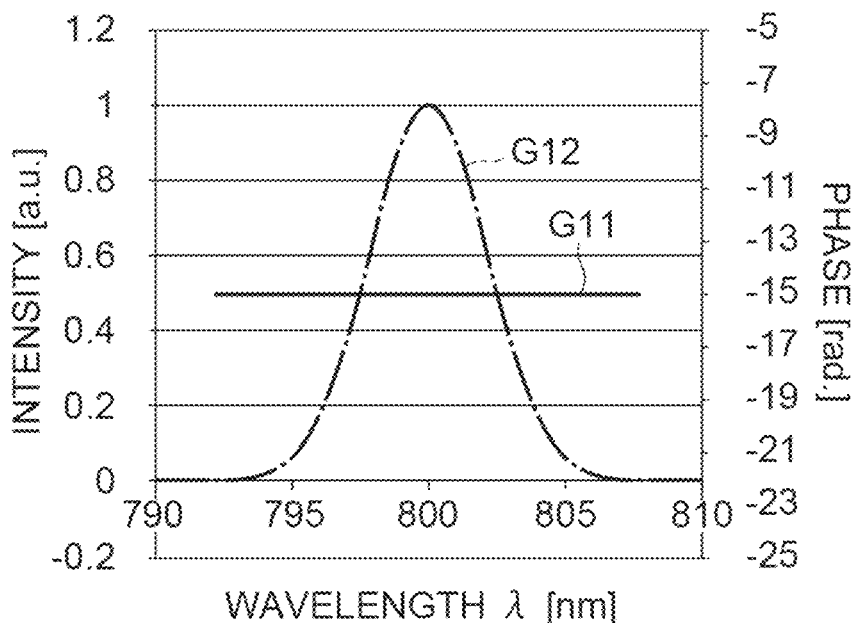
FIG. 8A illustrates a spectral waveform of a single pulse of wideband measurement light.
Figure 8B:
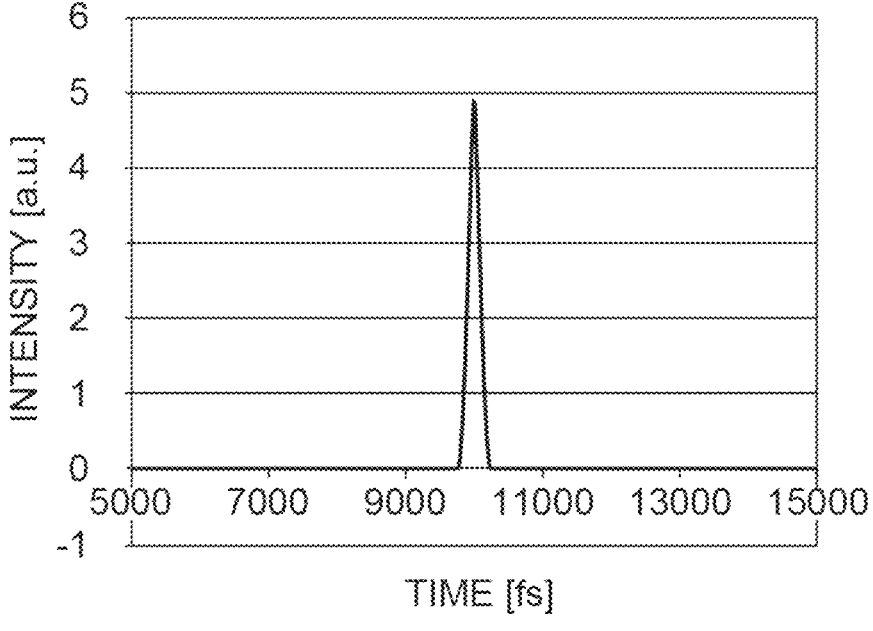
FIG. 8B illustrates a temporal intensity waveform of the wideband measurement light pulse.
Figure 9A:
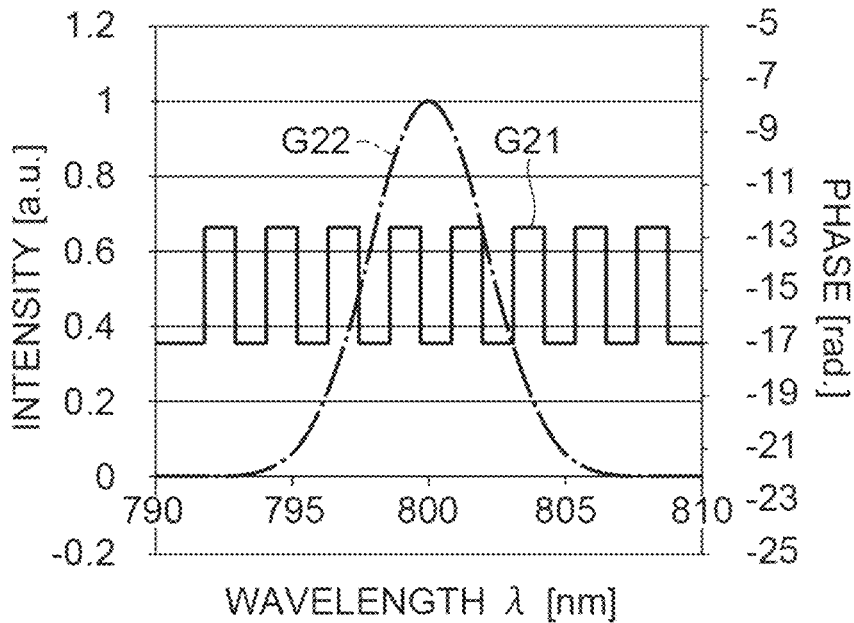
FIG. 9A illustrates a spectral waveform of output light from the pulse forming unit when a phase spectrum is modulated in a rectangular waveform by the SLM.
Figure 9B:
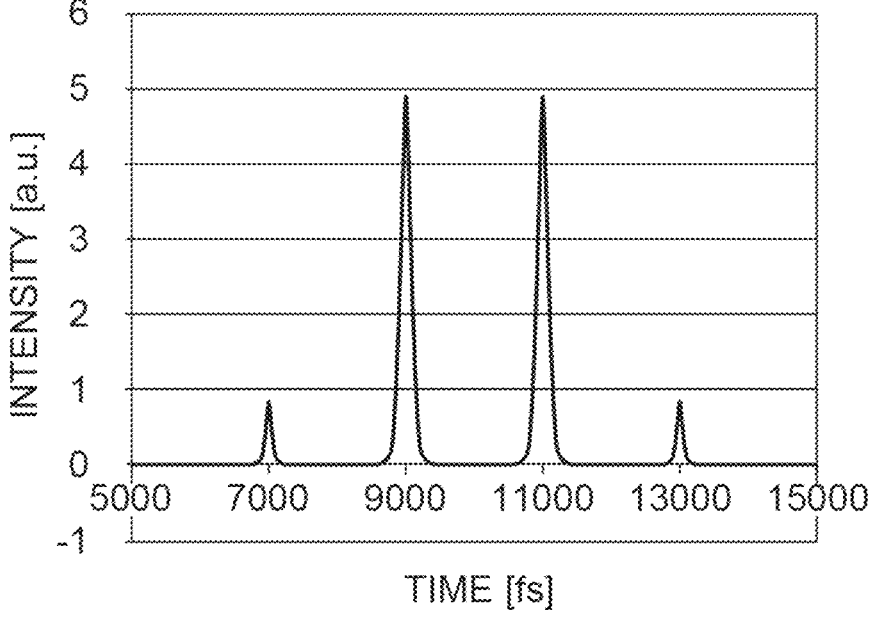
FIG. 9B illustrates a temporal intensity waveform of the output light.

FIG. 8A illustrates, for example, a spectral phase G11 and a spectral intensity G12 as spectral waveforms of the single pulsed wideband measurement light pulse Ps. FIG. 8B illustrates a temporal intensity waveform of the wideband measurement light pulse Ps. FIG. 9A illustrates, as an example, a spectral phase G21 and a spectral intensity G22, which are spectral waveforms of the output light from the pulse forming unit 4 when a phase spectrum is modulated in a rectangular waveform by the SLM 43. FIG. 9B illustrates a temporal intensity waveform of the output light. In FIGS. 8A and 9A, a horizontal axis indicates a wavelength (nm), a left vertical axis indicates an intensity value (arbitrary unit) of an intensity spectrum, and a right vertical axis indicates a phase value (rad) of the phase spectrum. In FIGS. 8B and 9B, a horizontal axis indicates time (femtoseconds) and a vertical axis indicates light intensity (arbitrary unit).

In this example, a rectangular phase spectrum waveform is applied to the output light so that the single pulse of the wideband measurement light pulse Ps is converted into a double pulse with higher-order light. The spectrum and waveform illustrated in FIG. 9A are examples. It is possible to shape the temporal intensity waveform of the output light from the pulse forming unit 4 into various shapes by a combination of various phase spectra and intensity spectra.

A phase modulation pattern for causing a temporal intensity waveform of output light of the pulse forming unit 4 to be closer to a desired waveform is configured as data for controlling the SLM 43, that is, data including a table of an intensity of a complex amplitude distribution or an intensity of a phase distribution. The modulation pattern is, for example, computer-generated holograms (CGH). In the present embodiment, the SLM 43 presents a phase pattern including a phase pattern for phase modulation that provides the output light with a phase spectrum to obtain a desired waveform and a phase pattern for intensity modulation that provides the output light with an intensity spectrum to obtain a desired waveform.

Figure 10:
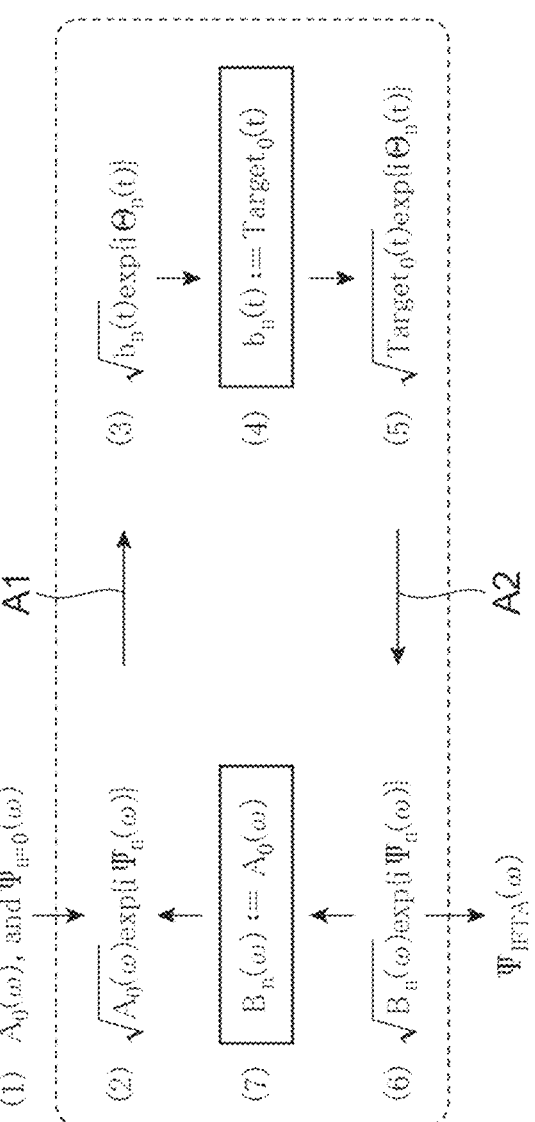
FIG. 10 is a diagram illustrating a procedure for calculating a phase spectrum using an iterative Fourier transform method.

The desired temporal intensity waveform is represented as a function of the time domain, and the phase spectrum is represented as a function of a frequency domain. Therefore, a phase spectrum corresponding to the desired temporal intensity waveform can be obtained, for example, through an iterative Fourier transform based on the desired temporal intensity waveform. FIG. 10 is a diagram illustrating a procedure for calculating a phase spectrum using an iterative Fourier transform method.

First, an initial intensity spectrum function $A_0(\omega)$ and an initial phase spectrum function $\Psi_0(\omega)$, which are functions of a frequency co, are prepared as shown in a process number (1) of FIG. 10. In one example, the intensity spectrum functions $A_0(\omega)$ and phase spectrum function $\Psi_0(\omega)$ indicate a spectral intensity and a spectral phase of input light, respectively. Next, a waveform function A in a frequency domain including an intensity spectrum function $A_0(\omega)$ and a phase spectrum function $\Psi_n(\omega)$ is prepared as illustrated in a process number (2) of FIG. 10.

[Equation 1]

$$\sqrt{A_0(\omega)}\exp\{i\Psi_n(\omega)\} \tag{a}$$

The subscript n indicates after an n-th Fourier transform process. Before the first Fourier transform process, the above-described initial phase spectrum function $\Psi_0(\omega)$ is used as the phase spectrum function $\Psi_n(\omega)$. Here, i is an imaginary unit.

Subsequently, Fourier transform from the frequency domain to the time domain is performed on the waveform function A, as indicated by an arrow A1. Accordingly, a waveform function B in the time domain including a temporal intensity waveform function $b_n(t)$ and a temporal phase waveform function $\Theta_n(t)$ is obtained, as shown in a process number (3) of FIG. 10.

[Equation 2]

$$\sqrt{b_n(t)}\exp\{i\Theta_n(t)\} \tag{b}$$

Subsequently, the temporal intensity waveform function $b_n(t)$ included in the waveform function B is replaced with a temporal intensity waveform function $Target_0(t)$ based on the desired waveform, as shown in process numbers (4) and (5) of FIG. 10. The desired waveform is defined, for example, by the time interval and number of light pulses.

[Equation 3]

$$b_n(t):=Target_0(t) \tag{c}$$

[Equation 4]

$$\sqrt{Target_0(t)}\exp\{i\Theta_n(t)\} \tag{d}$$

Subsequently, inverse Fourier transform from the time domain to the frequency domain is performed on a function (d), as indicated by an arrow A2. Accordingly, a waveform function (e) in the frequency domain including an intensity spectrum function $B_n(\omega)$ and the phase spectrum function $\Psi_n(\omega)$ is obtained, as shown in a process number (6) of FIG. 10.

[Equation 5]

$$\sqrt{B_n(\omega)}\exp\{i\Psi_n(\omega)\} \tag{e}$$

Subsequently, in order to constrain intensity spectrum function $B_n(\omega)$ included in the function (e), the intensity spectrum function $B_n(\omega)$ is replaced with the initial intensity spectrum function $A_0(\omega)$, as shown in a process number (7) of FIG. 10.

[Equation 6]

$$B_n(\omega):=A_0(\omega) \tag{f}$$

Thereafter, by repeating the processes (2) to (7) a plurality of times, it is possible to cause a phase spectrum shape indicated by the phase spectrum function $\Psi_n(\omega)$ in the waveform function to be closer to a phase spectrum shape corresponding to the desired temporal intensity waveform. A modulation pattern for obtaining a desired temporal intensity waveform, that is, the plurality of measurement light pulses Pa including two or more light pulses is created on the basis of a finally obtained phase spectrum function $\Psi_{IFTA}(\omega)$.

Figure 11:
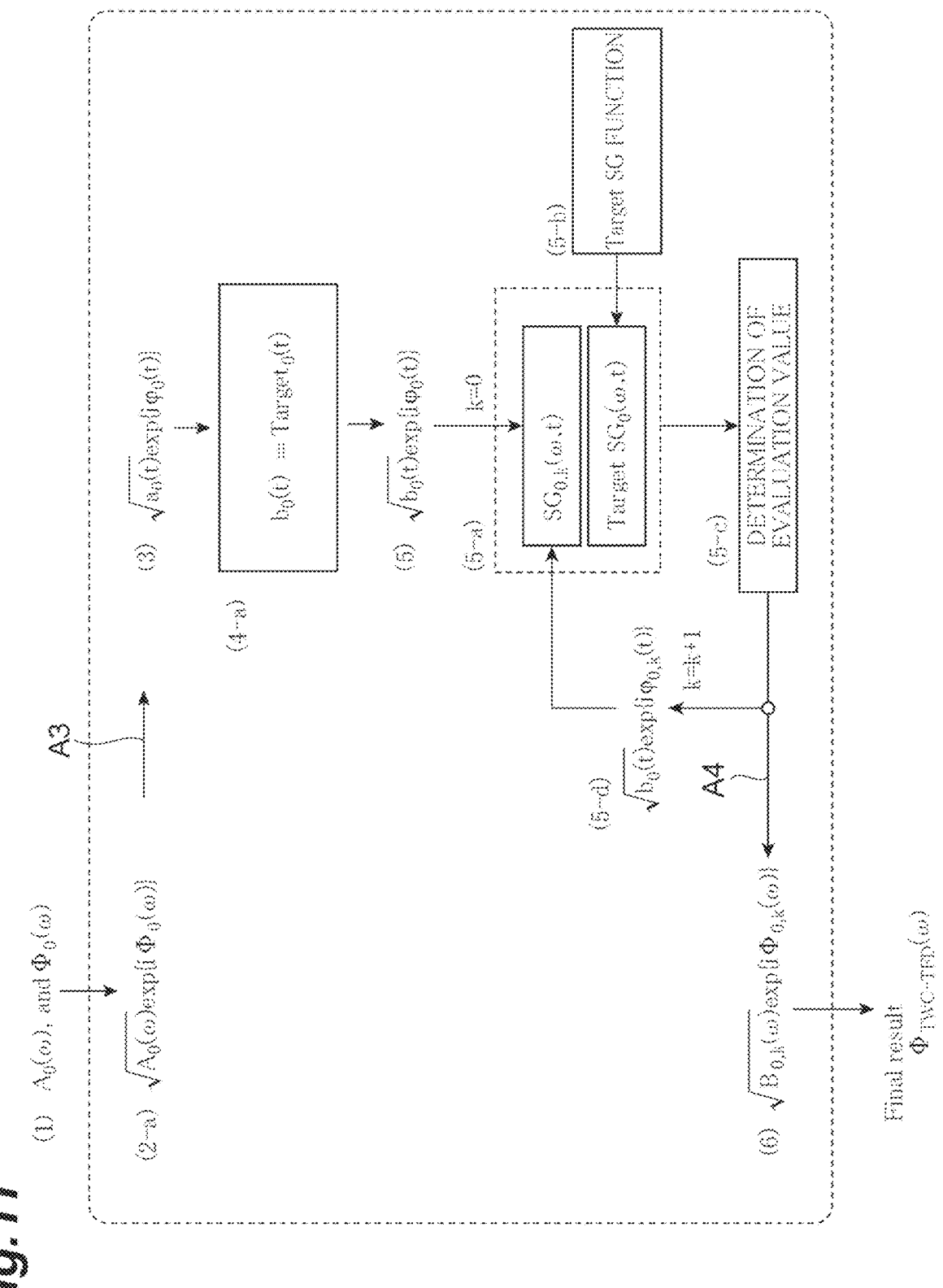
FIG. 11 is a diagram illustrating a procedure for calculating a phase spectrum function.

In the iterative Fourier transform method as described above, the temporal intensity waveform can be controlled, but frequency components forming the temporal intensity waveform, in other words, a band wavelength, cannot be controlled. Therefore, when center wavelengths of two or more light pulses forming the plurality of measurement light pulses Pa are made different from each other, the phase spectrum function and the intensity spectrum function which are a basis of the modulation pattern are calculated by using a calculation method to be described below. FIG. 11 is a diagram illustrating a procedure for calculating the phase spectrum function.

First, the initial intensity spectrum function $A_0(\omega)$ and the phase spectrum function $\Phi_0(\omega)$, which are functions of a frequency $\omega$, are prepared as shown in a process number (1) of FIG. 11. In one example, the intensity spectrum function $A_0(\omega)$ and the phase spectrum function $\Phi_0(\omega)$ indicate the spectral intensity and the spectral phase of the input light, respectively. Then, a first waveform function (g) in the frequency domain including the intensity spectrum function $A_0(\omega)$ and the phase spectrum function $\Phi_0(\omega)$ is prepared, as illustrated in a process number (2-$a$) of FIG. 11. Here, i is an imaginary unit.

[Equation 7]

$$\sqrt{A_0(\omega)}\exp\{i\Phi_0(\omega)\} \tag{g}$$

Subsequently, Fourier transform from the frequency domain to the time domain is performed on the first waveform function (g), as indicated by an arrow A3 in FIG. 11. Accordingly, a second waveform function (h) in the time domain including a temporal intensity waveform function $a_0(t)$ and a temporal phase waveform function $\varphi_0(t)$ is obtained as shown in a process number (3) of FIG. 11.

[Equation 8]

$$\sqrt{a_0(t)}\exp\{i\varphi_0(t)\} \tag{h}$$

Subsequently, the temporal intensity waveform function $Target_0(t)$ based on the desired waveform is substituted into a temporal intensity waveform function $b_0(t)$, as shown in Equation (i) below (a process number (4-$a$)). The desired waveform is defined, for example, by the time interval and number of light pulses.

[Equation 9]

$$b_0(t)=Target_0(t) \tag{i}$$

Subsequently, the temporal intensity waveform function $a_0(t)$ is replaced with the temporal intensity waveform function $b_0(t)$, as shown in Equation (j) below. That is, the temporal intensity waveform function $a_0(t)$ included in the second waveform function (h) is replaced with the temporal intensity waveform function $Target_0(t)$ based on the desired waveform, as shown in a process number (5) of FIG. 11.

[Equation 10]

$$b_0(t)\exp\{i\varphi_0(t)\} \tag{j}$$

Subsequently, the second waveform function is corrected so that a spectrogram of the second waveform function (j) after replacement approaches a target spectrogram generated in advance according to a desired wavelength band. First, the second waveform function (j) after replacement is subjected to time-frequency conversion so that the second waveform function (j) is converted into a spectrogram $SG_{0,K}(\omega, t)$, as illustrated in a process number (5-$a$) of FIG. 11. The subscript k indicates a k-th conversion process.

Here, the time-frequency conversion is to convert a composite signal such as a temporal waveform into three-dimensional information including a time, a frequency, and an intensity of a signal component, that is, a spectral intensity, by performing a frequency filtering process or a value calculation process on the composite signal. The value calculation process is a process of deriving a spectrum for each time by multiplication while shifting a window function. In the present embodiment, a conversion result (a time, frequency, and spectral intensity) thereof is defined as a "spectrogram". Examples of the time-frequency conversion include a short-time Fourier transform (STFT) and a wavelet transform, such as Haar wavelet transform, Gabor wavelet transform, Mexican hat wavelet transform, or Morley wavelet transform.

Further, a target spectrogram $TargetSG_0(\omega, t)$ generated according to the desired wavelength band in advance is acquired. This target spectrogram $TargetSG_0(\omega, t)$ has approximately the same value as a target temporal waveform (a temporal intensity waveform and frequency components forming the temporal intensity waveform), and is generated in a target spectrogram function of a process number (5-$b$).

Next, a degree of similarity, that is, a degree of matching between the spectrogram $SG_{0,K}(\omega, t)$ and target spectrogram $TargetSG_0(\omega, t)$ is examined by pattern matching. In the present embodiment, an evaluation value is calculated as an index indicating a degree of similarity. In a subsequent process number (5-$c$), a determination is made as to whether or not the obtained evaluation value satisfies a predetermined ending condition. When the condition is satisfied, the process proceeds to a process number (6), and when the condition is not satisfied, the process proceeds to a process number (5-$d$). In the process number (5-$d$), the temporal phase waveform function $\varphi_0(t)$ included in the second waveform function is changed to any temporal phase waveform function $\varphi_{0,k}(t)$. The second waveform function after the temporal phase waveform function is changed is converted into a spectrogram through the time-frequency conversion such as STFT again.

Thereafter, the above-described process numbers (5-a) to (5-d) are repeated. Thus, the second waveform function is corrected so that the spectrogram $SG_{0,K}(\omega, t)$ gradually approaches the target spectrogram $TargetSG_0(\omega, t)$. Thereafter, inverse Fourier transform is performed on the second waveform function after correction, as indicated by an arrow A4 in FIG. 11. Accordingly, a third waveform function (k) in a frequency domain is generated, as shown in the process number (6) of FIG. 11.

[Equation 11]

$$\sqrt{B_{0,k}(\omega)}\exp\{i\Phi_{0,k}(\omega)\} \tag{k}$$

A phase spectrum function $\Phi_{0,k}(\omega)$ included in the third waveform function (k) becomes a finally obtained desired phase spectrum function $\Phi_{TWC\text{-}TFD}(\omega)$. The modulation pattern is created on the basis of this phase spectrum function $\Phi_{TWC\text{-}TFD}(\omega)$.

Figure 12:
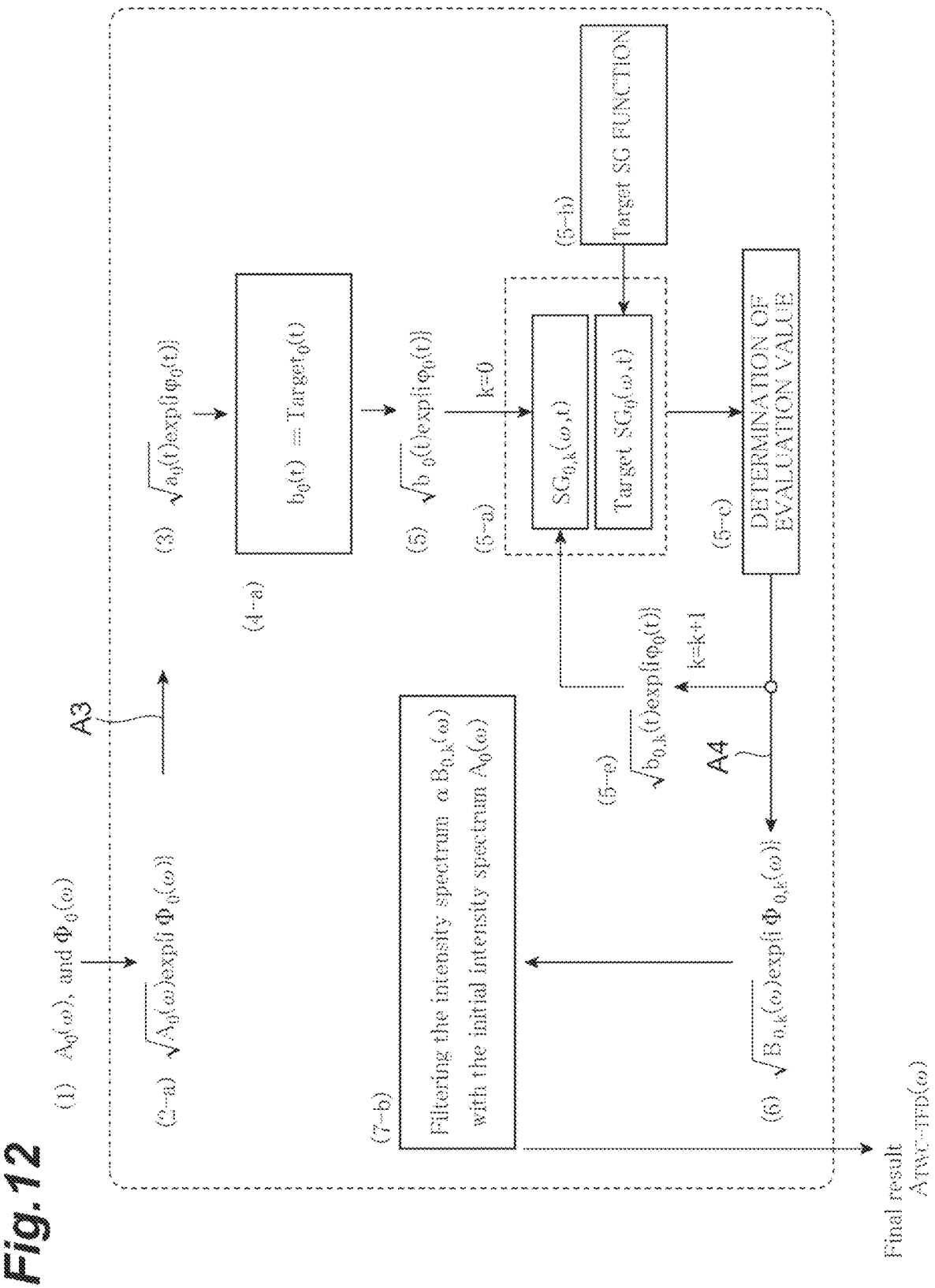
FIG. 12 is a diagram illustrating a procedure for calculating a spectral intensity.

FIG. 12 is a diagram illustrating a procedure for calculating the spectral intensity. Since the process numbers (1) to (5-c) are the same as the above-described spectral phase calculation procedure, description thereof will be omitted.

When an evaluation value indicating the degree of similarity between the spectrogram $SG_{0,K}(\omega, t)$ and the target spectrogram $TargetSG_0(\omega, t)$ does not satisfy the predetermined ending condition, the temporal phase waveform function $\varphi_0(t)$ included in the second waveform function is constrained as an initial value, and the temporal intensity waveform function $b_0(t)$ is changed to any temporal intensity waveform function $b_{0,k}(t)$, as shown in a process number (5-e). The second waveform function after the temporal intensity waveform function has been changed is converted into a spectrogram through the time-frequency conversion such as STFT again.

Thereafter, the process numbers (5-a) to (5-c) are repeated. Thus, the second waveform function is corrected so that the spectrogram $SG_{0,K}(\omega, t)$ gradually approaches the target spectrogram $TargetSG_0(\omega, t)$. Thereafter, inverse Fourier transform is performed on the second waveform function after correction, as indicated by the arrow A4 in FIG. 12. Accordingly, a third waveform function (in) in a frequency domain is generated, as shown in a process number (6) of FIG. 12.

[Equation 12]

$$\sqrt{B_{0,k}(\omega)}\exp\{i\Phi_{0,k}(\omega)\} \tag{m}$$

Subsequently, in a process number (7-b), a filtering process based on the intensity spectrum of the input light is performed on the intensity spectrum function $B_{0,k}(\omega)$ included in the third waveform function (m). Specifically, a portion exceeding a cutoff intensity for each wavelength determined on the basis of the intensity spectrum of the input light is cut away from an intensity spectrum obtained by multiplying the intensity spectrum function $B_{0,k}(\omega)$ by a coefficient $\alpha$. This is to prevent an intensity spectrum function $\alpha B_{0,k}(\omega)$ from exceeding the spectral intensity of the input light in all wavelength ranges.

In one example, the cutoff intensity for each wavelength is set to match the intensity spectrum of the input light. The intensity spectrum of the input light is the initial intensity spectrum function $A_0(\omega)$ in the present embodiment. In this case, in the process number (7-b) of FIG. 12, a value of the intensity spectrum function $A_0(\omega)$ is taken as a value of an intensity spectrum function $A_{TWC\text{-}TFD}(\omega)$ at frequencies in which the intensity spectrum function $\alpha B_{0,k}(\omega)$ is larger than the intensity spectrum function $A_0(\omega)$, as shown in Equation (n) below. The value of the intensity spectrum function $\alpha B_{0,k}(\omega)$ is taken as the value of the intensity spectrum function $A_{TWC\text{-}TFD}(\omega)$ at frequencies in which the intensity spectrum function $\alpha B_{0,k}(\omega)$ is equal to or smaller than the intensity spectrum function $A_0(\omega)$.

[Equation 13]

$$A_{TWC\text{-}TFD}(\omega) = \begin{cases} A_0(\omega) & A_0(\omega) < \alpha B_{0,k}(\omega) \\ \alpha B_{0,k}(\omega) & A_0(\omega) < \alpha B_{0,k}(\omega) \end{cases} \tag{n}$$

This intensity spectrum function $A_{TWC\text{-}TFD}(\omega)$ is used for generation of the modulation pattern as a finally obtained desired spectral intensity.

Figure 13:
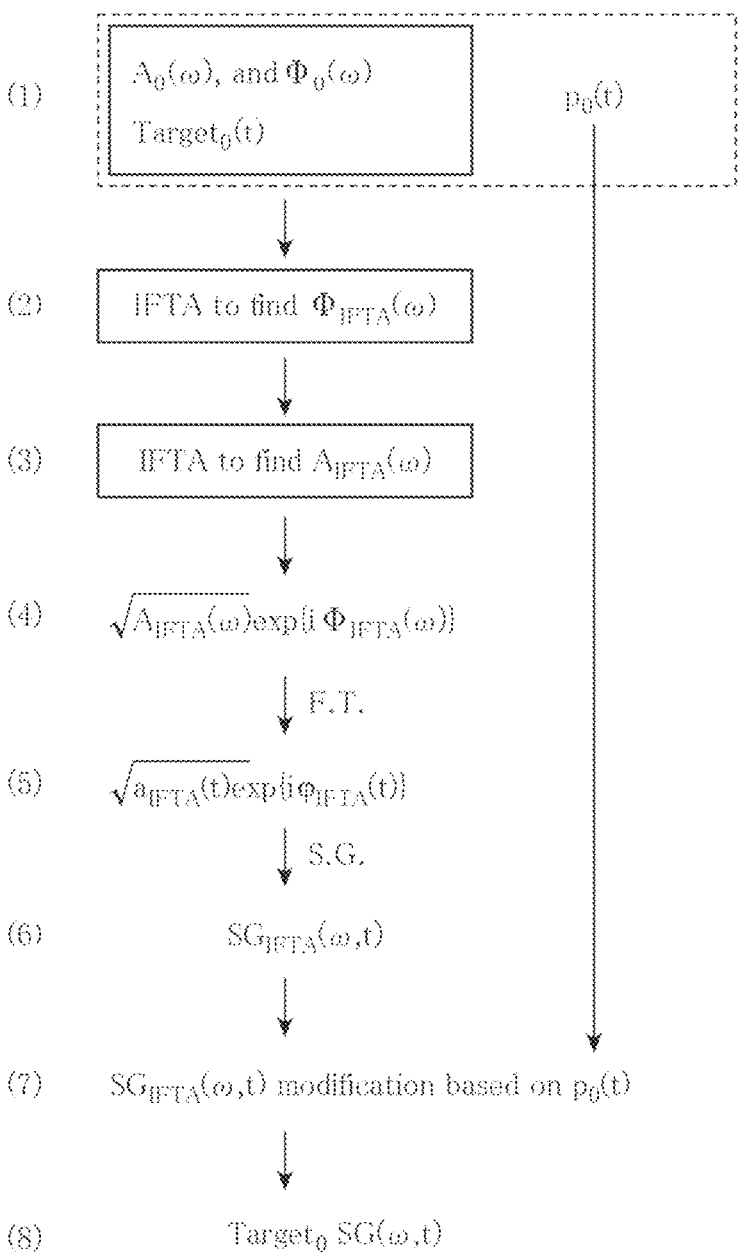
FIG. 13 is a diagram illustrating an example of a procedure for generating a target spectrogram.

A phase modulation pattern, for example, computer-generated holograms, for giving a spectral phase indicated by the phase spectrum function $\Phi_{TWC\text{-}TFD}(\omega)$ and a spectral intensity indicated by the intensity spectrum function $A_{TWC\text{-}TFD}(\omega)$ to the output light is calculated. FIG. 13 is a diagram illustrating an example of a procedure for generating the target spectrogram $TargetSG_0(\omega, t)$. The target spectrogram $TargetSG_0(\omega, t)$ indicates a target temporal waveform, that is, a target temporal intensity waveform and frequency components (wavelength band components) forming the target temporal intensity waveform. A creation of the target spectrogram is an extremely important process in controlling a frequency component (wavelength band component).

Figure 14:
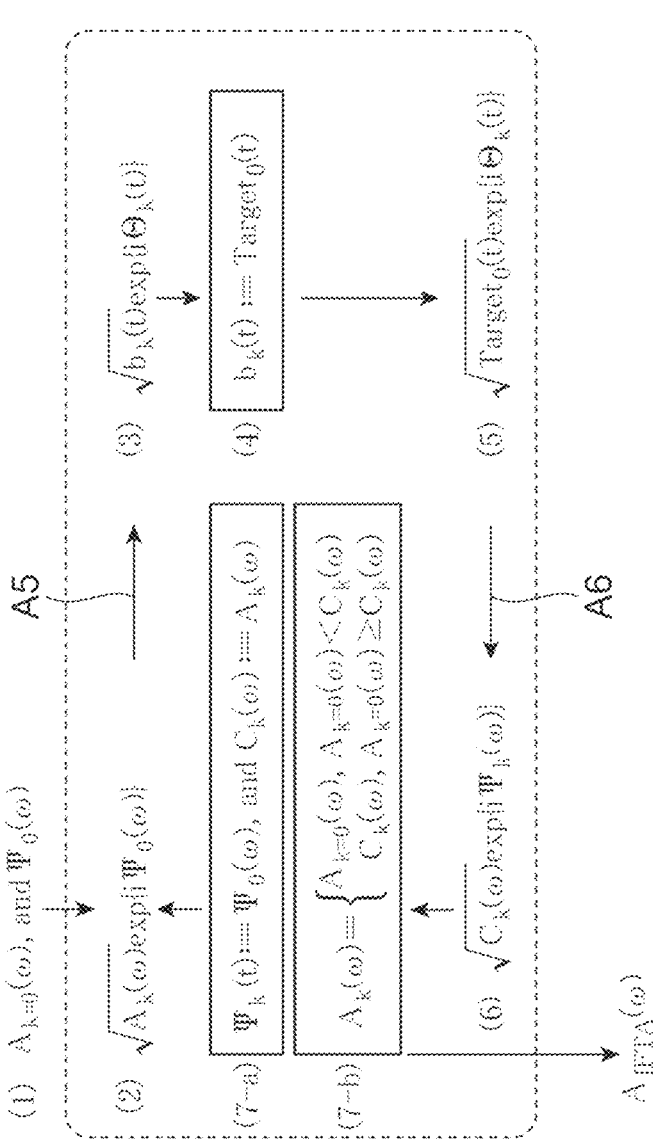
FIG. 14 is a diagram illustrating an example of a procedure for calculating an intensity spectrum function.

First, in the process number (1) of FIG. 13, a spectrum waveform and a desired temporal intensity waveform function $Target_0(t)$ are input. The spectral waveforms are an initial intensity spectrum function $A_0(\omega)$ and an initial phase spectrum function $\Phi_0(\omega)$. In parallel with this, a time function $p_0(t)$ including a desired frequency band information or wavelength band information is input. Then, a phase spectrum function $\Phi_{IFTA}(\omega)$ for realizing the temporal intensity waveform function $Target_0(t)$ is calculated by using, for example, the iterative Fourier transform method illustrated in FIG. 10, as shown in a process number (2) of FIG. 13. Subsequently, an intensity spectrum function $A_{IFTA}(\omega)$ for realizing the temporal intensity waveform function $Target_0$ (t) is calculated using the iterative Fourier transform method in which the previously obtained phase spectrum function $\Phi_{IFTA}(\omega)$ is used, as shown in a process number (3) of FIG. 13. FIG. 14 is a diagram illustrating an example of a procedure for calculating the intensity spectrum function $A_{IFTA}(\omega)$.

First, an initial intensity spectrum function $A_{k=0}(\omega)$ and the phase spectrum function $\Psi_0(\omega)$ are prepared, as shown in a process number (1) of FIG. 14. Then, a waveform function (o) in the frequency domain including the intensity spectrum function $A_k(\omega)$ and the phase spectrum function $\Psi_0(\omega)$ is prepared, as illustrated in the process number (2) of FIG. 14.

[Equation 14]

$$\sqrt{A_k(\omega)}\exp\{i\Psi_0(\omega)\} \tag{o}$$

The subscript k indicates after a k-th Fourier transform process. Before an initial (first) Fourier transform process, the above initial intensity spectrum function $A_{k=0}(\omega)$ is used as the intensity spectrum function $A_k(\omega)$. Here, i is an imaginary unit.

Subsequently, a Fourier transform from the frequency domain to the time domain is performed on the waveform function (o), as indicated by an arrow A5. Accordingly, a waveform function (p) in a time domain including a temporal intensity waveform function $b_k(t)$ is obtained, as shown in a process number (3) of FIG. 14.

[Equation 15]

$$\sqrt{b_k(t)}\exp\{i\Theta_k(t)\} \tag{p}$$

Subsequently, the temporal intensity waveform function $b_k(t)$ included in the waveform function (p) is replaced with the temporal intensity waveform function $\mathrm{Target}_0(t)$ based on the desired waveform, as shown in process numbers (4) and (5) of FIG. 14. The desired waveform is defined, for example, by the time interval and number of light pulses.

[Equation 16]

$$b_k(t):=\mathrm{Target}_0(t) \tag{q}$$

[Equation 17]

$$\sqrt{\mathrm{Target}_0(t)}\exp\{i\Theta_k(t)\} \tag{r}$$

Subsequently, the inverse Fourier transform from the time domain to the frequency domain is performed on the function (r), as indicated by an arrow A6. Accordingly, a waveform function (s) in a frequency domain including an intensity spectrum function $C_k(\omega)$ and a phase spectrum function $\Psi_k(\omega)$ is obtained, as shown in a process number (6) of FIG. 14.

[Equation 18]

$$\sqrt{C_k(\omega)}\exp\{i\Psi_k(\omega)\} \tag{s}$$

Subsequently, in order to constrain the phase spectrum function $\Psi_k(\omega)$ included in the waveform function (s), the phase spectrum function $\Psi_k(\omega)$ is replaced with the initial phase spectrum function $\Psi_0(\omega)$, as illustrated in a process number (7-a) of FIG. 14.

[Equation 19]

$$\Psi_k(\omega):=\Psi_0(\omega) \tag{t}$$

In parallel with that, a filtering process based on the intensity spectrum of the input light is performed on the intensity spectrum function $C_k(\omega)$ in the frequency domain after the inverse Fourier transform. Specifically, a portion exceeding a cutoff intensity for each wavelength determined on the basis of the intensity spectrum of the input light is cut away from the intensity spectrum indicated by the intensity spectrum function $C_k(\omega)$.

In one example, the cutoff intensity for each wavelength is set to match the intensity spectrum of the input light, for example, the initial intensity spectrum function $A_{k=0}(\omega)$. In this case, in the process number (7-b) of FIG. 14, a value of the intensity spectrum function $A_{k=0}(\omega)$ is taken as a value of the intensity spectrum function $A_k(\omega)$ at a frequency in which the intensity spectrum function $C_k(\omega)$ is larger than the intensity spectrum function $A_{k=0}(\omega)$, as shown in Equation (u) below. A value of the intensity spectrum function $C_k(\omega)$ is taken as the value of the intensity spectrum function $A_k(\omega)$ at frequencies in which the intensity spectrum function $C_k(\omega)$ is equal to or smaller than the intensity spectrum function $A_{k=0}(\omega)$.

[Equation 20]

$$A_k(\omega) = \begin{cases} A_{k=0}(\omega), & A_{k=0}(\omega) < C_k(\omega) \\ C_k(\omega) & A_{k=0}(\omega) \geq C_k(\omega) \end{cases} \tag{u}$$

The intensity spectrum function $C_k(\omega)$ included in the waveform function (s) is replaced with the intensity spectrum function $A_k(\omega)$ after a filtering process using Equation (u).

Thereafter, by repeating the processes (2) to (7-b), it is possible to cause an intensity spectrum shape indicated by the intensity spectrum function $A_k(\omega)$ in the waveform function to be closer to an intensity spectrum shape corresponding to the desired temporal intensity waveform. Finally, the intensity spectrum function $A_{IFTA}(\omega)$ is obtained.

FIG. 13 will be referred to again. By calculation of the phase spectrum function $\Phi_{IFTA}(\omega)$ and the intensity spectrum function $A_{IFTA}(\omega)$ in the process numbers (2) and (3) described above, a third waveform function (v) in the frequency domain including these functions is obtained as shown in a process number (4) of FIG. 13.

[Equation 21]

$$\sqrt{A_{IFTA}(\omega)}\exp\{i\Phi_{IFTA}(\omega)\} \tag{v}$$

Next, the third waveform function (v) is Fourier transformed. Accordingly, a fourth waveform function ($\omega$) in the time domain is obtained as shown in a process number (5) of FIG. 13.

[Equation 22]

$$\sqrt{a_{IFTA}(t)}\exp\{i\varphi_{IFTA}(t)\} \tag{w}$$

Next, the fourth waveform function ($\omega$) is converted into a spectrogram $SG_{IFTA}(\omega, t)$ by the time-frequency conversion, as illustrated in a process number (6) of FIG. 13. In a process number (7) of FIG. 13, the target spectrogram $\mathrm{TargetSG}_0(\omega)$ is generated by correcting the spectrogram $SG_{IFTA}(\omega, t)$ on the basis of the time function $p_0(t)$ including the desired frequency band information or wavelength band information. For example, a characteristic pattern appearing in the spectrogram $SG_{IFTA}(\omega, t)$ including two-dimensional data is partially cut out, and an operation of a frequency component of such a portion is performed on the basis of the time function $p_0(t)$. Hereinafter, a specific example thereof will be described in detail.

Figure 15A:
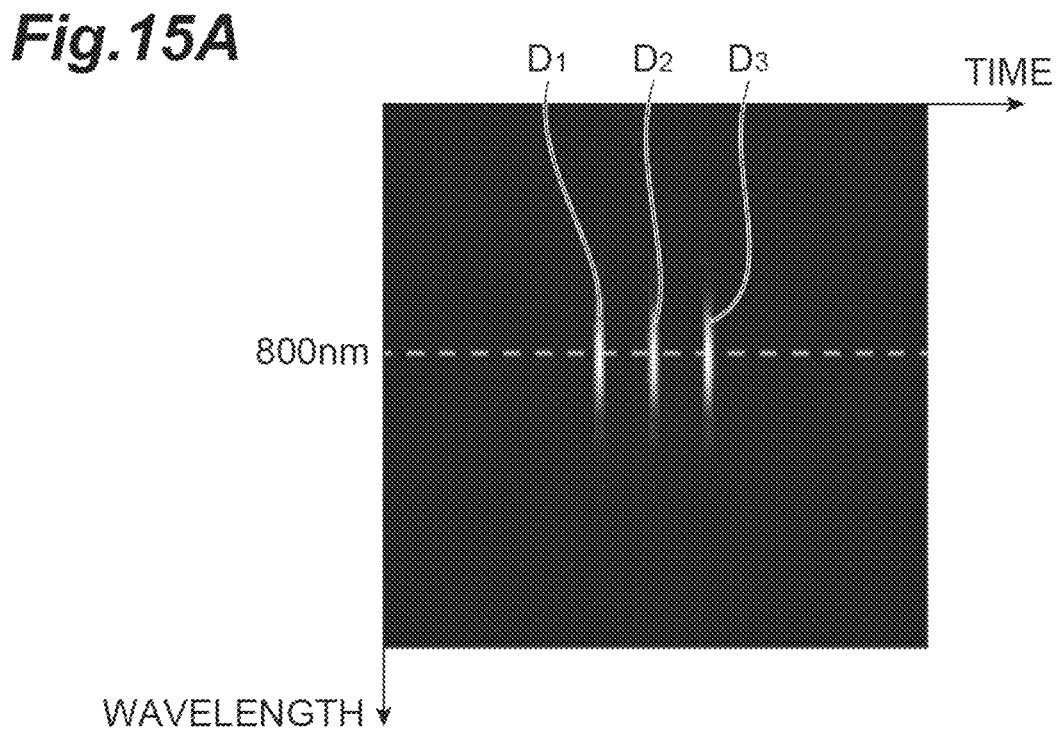
FIG. 15A is a diagram illustrating a spectrogram $SG_{IFTA}$ ($\omega$, t).

For example, a case in which a triple pulse having a time interval of 2 picoseconds is set as the desired temporal intensity waveform function $\mathrm{Target}_0(t)$ will be considered. In this case, the spectrogram $SG_{IFTA}(\omega, t)$ becomes a result as illustrated in FIG. 15A. In FIG. 15A, a horizontal axis indicates time (femtoseconds) and a vertical axis indicates wavelength (nm). A value of the spectrogram is indicated by lightness and darkness of the figure, and the higher the brightness, the larger the value of the spectrogram. In this spectrogram $SG_{IFTA}(\omega, t)$, the triple pulse appears as domains $D_1$, $D_2$, and $D_3$ divided on a time axis at 2-picosecond intervals. A center (peak) wavelength of the domains $D_1$, $D_2$, and $D_3$ is 800 nm.

Figure 15B:
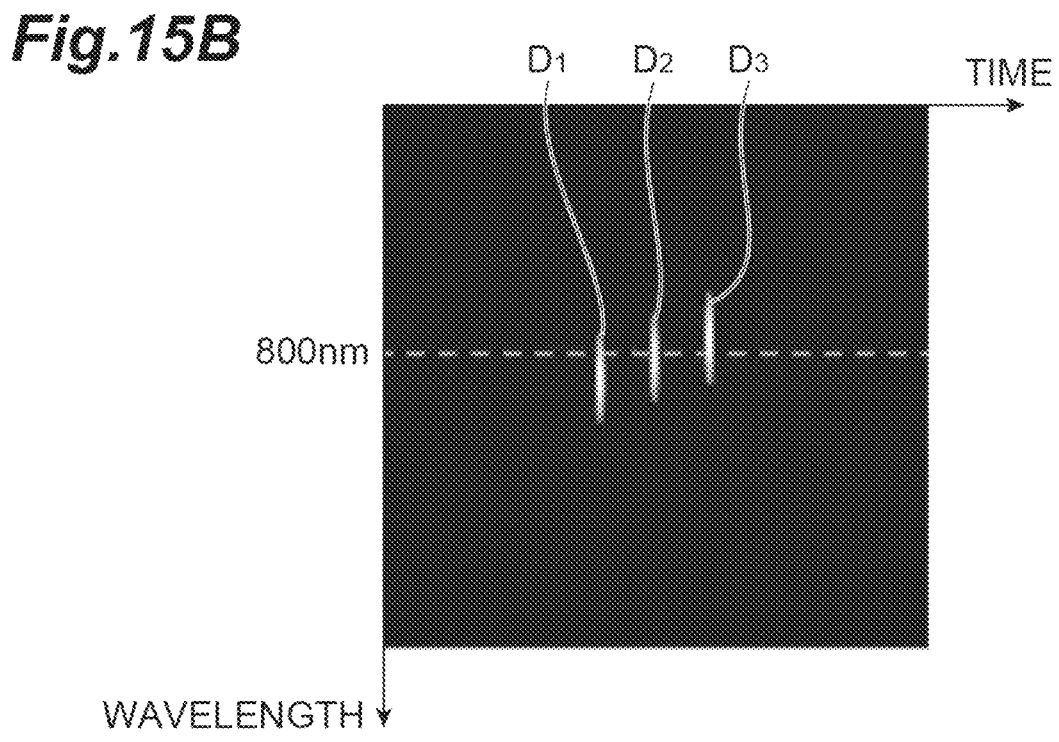
FIG. 15B is a diagram illustrating a target spectrogram $TargetSG_0(\omega, t)$ in which the spectrogram $SG_{IFTA}(\omega, t)$ has been changed.

When only the temporal intensity waveform of the output light is desired to be controlled, that is, when the triple pulse is desired to be obtained, it is not necessary to operate these domains $D_1$, $D_2$, and $D_3$. However, when a frequency band or wavelength band of each pulse is desired to be controlled, it is necessary to operate these domains $D_1$, $D_2$, and $D_3$. That is, moving the domains $D_1$, $D_2$, and $D_3$ independently of each other in a direction along the wavelength axis (the vertical axis) as illustrated in FIG. 15B means changing constituent frequencies or wavelength bands of the respective pulses. Such a change in the constituent frequency or wavelength band of each pulse is performed on the basis of the time function $p_0(t)$.

For example, when the time function $p_0(t)$ is described so that a peak wavelength of the domain $D_2$ is fixed at 800 nm and respective peak wavelengths of the domains $D_1$ and $D_3$ are translated by $-2$ nm and $+2$ nm, the spectrogram $SG_{IFTA}(\omega, t)$ changes into the target spectrogram TargetSG$_0$ $(\omega, t)$ illustrated in FIG. 15B. For example, by applying such a process to the spectrogram, it is possible to create a target spectrogram in which the constituent frequency or wavelength band of each pulse has been arbitrarily controlled without changing a shape of the temporal intensity waveform.

Figure 16:
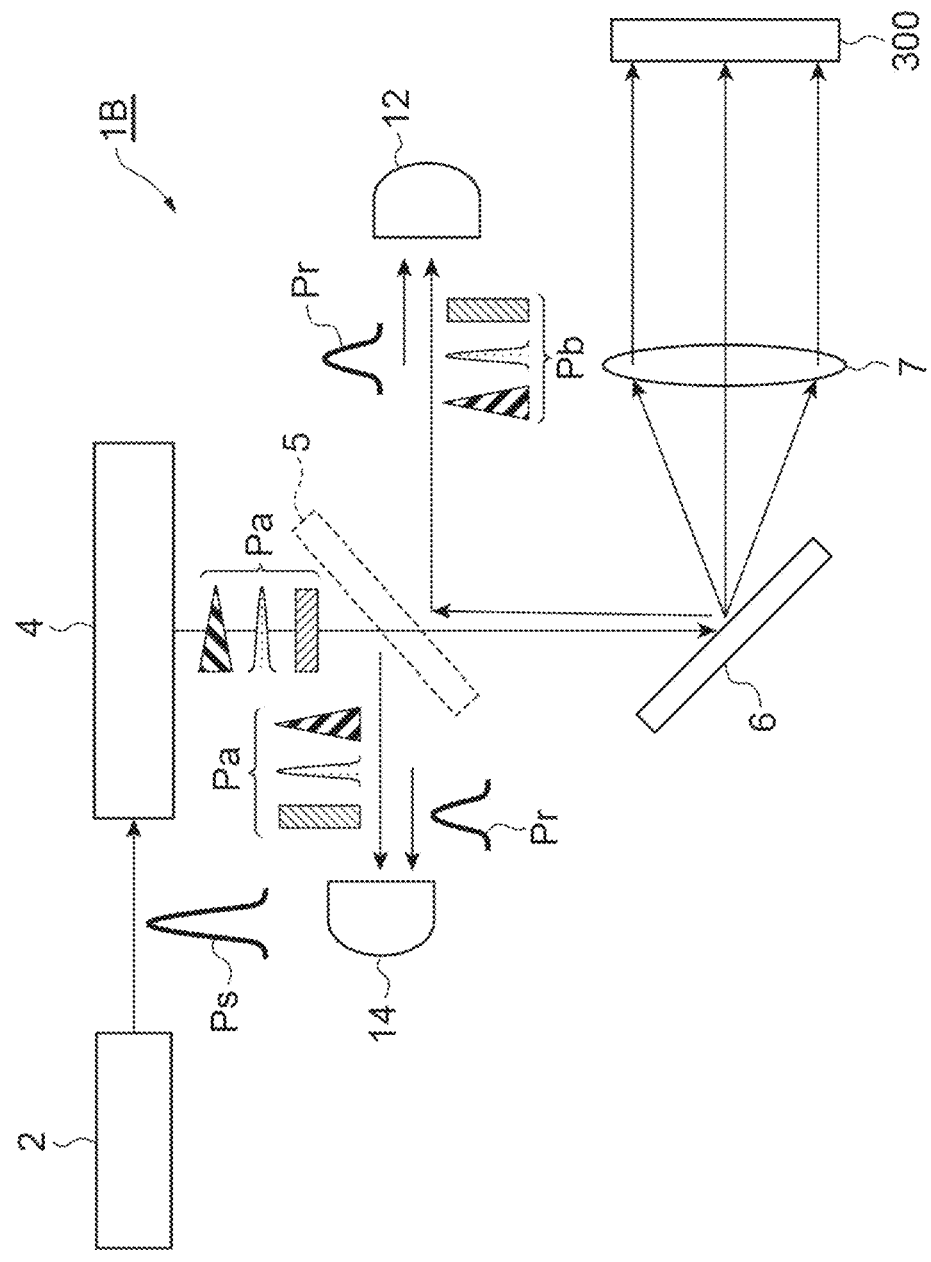
FIG. 16 is a diagram illustrating an example of a configuration of a surface roughness measurement device according to a second embodiment.

FIG. 16 is a diagram illustrating an example of a configuration of a surface roughness measurement device 1B according to a second embodiment of the optical measurement device of the present disclosure. The configuration of the surface roughness measurement device 1B is the same as that of the distance measurement device 1A according to the first embodiment illustrated in FIGS. 1 to 3 except that a configuration for measuring temporal waveforms of the plurality of measurement light pulses Pa is added. Although not illustrated in FIG. 16, the surface roughness measurement device 1B also includes a correlation optical system and a signal processing device similar to the distance measurement device 1A. The surface roughness measurement device 1B measures a surface roughness of the object 300 which is a measurement object.

In the surface roughness measurement device 1B, the plurality of measurement light pulses Pa formed by the pulse forming unit 4 pass through the beam splitter 5 and are incident on the surface of the object 300 which is a measurement object. The plurality of measurement light pulses Pa are reflected by the surface of the object 300 and become the plurality of reflected light pulses Pb. The plurality of reflected light pulses Pb are incident on a correlation optical system (not illustrated) together with the reference light pulse Pr. The plurality of reflected light pulses Pb become correlated light including a correlation with the reference light pulse Pr and are incident on the optical detector 12. The temporal waveforms of the plurality of reflected light pulses Pb are measured by using the optical sampling technology using the correlation optical system. Since a procedure thereof is the same as that of the distance measurement device 1A, detailed description thereof will be omitted.

On the other hand, the plurality of measurement light pulses Pa are reflected by the beam splitter 5 and are incident on the correlation optical system (not illustrated) together with the reference light pulse Pr. The plurality of measurement light pulses Pa become correlated light including a correlation with the reference light pulse Pr, and are incident on the optical detector 14. The temporal waveform of the plurality of measurement light pulses Pa is also measured by using the optical sampling technology using the correlation optical system.

Figure 17:
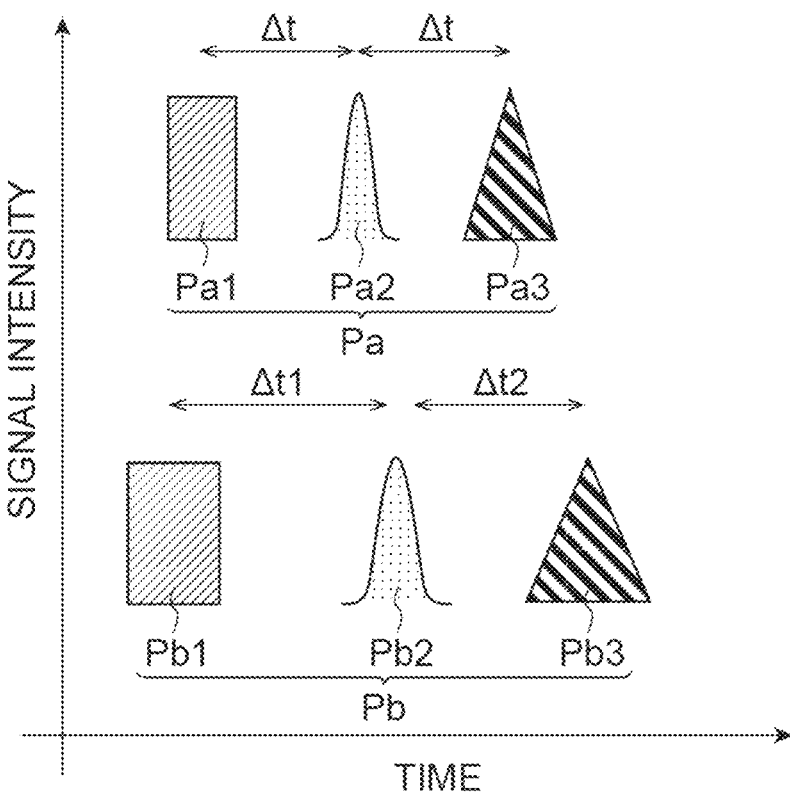
FIG. 17 is a diagram schematically illustrating an example of temporal waveforms of a plurality of measurement light pulses and a plurality of reflected light pulses measured by the surface roughness measurement device according to the second embodiment.

FIG. 17 is a diagram schematically illustrating an example of temporal waveforms of the plurality of measurement light pulses Pa and the plurality of reflected light pulses Pb measured by the surface roughness measurement device 1B according to the second embodiment.

In the surface roughness measurement device 1B, the plurality of measurement light pulses Pa have time intervals as schematically illustrated in an upper portion of FIG. 17, and form a measurement light pulse train. The time intervals of the plurality of measurement light pulses Pa are, for example, the same $\Delta t$. On the other hand, time intervals of the plurality of reflected light pulses Pb changes from $\Delta t$ to $\Delta t1$ and $\Delta t2$, and differs from each other, as schematically illustrated in a lower portion of FIG. 17.

When the surface of the object 300 is an ideal flat surface, that is, a completely flat surface, the time intervals of the plurality of reflected light pulses Pb does not change and are the same as the intervals of the plurality of measurement light pulses Pa. Since a difference between each of the time intervals of the plurality of reflected light pulses Pb and each of the time intervals of the plurality of measurement light pulses Pa is an amount indicating the surface roughness of the object 300, this is measured so that the surface roughness of the object 300 can be measured.

In the plurality of measurement light pulses Pa illustrated in the upper part of FIG. 17, the time intervals of the light pulses are all the same. However, in order to measure the surface roughness of the object 300, it is sufficient to know the difference between each of the time intervals of the plurality of reflected light pulses Pb and each of the time intervals of the plurality of measurement light pulses Pa. Therefore, at least two of the time intervals of the plurality of measurement light pulses Pa are set not to be the same as each other.

The distance measurement device 1A according to the first embodiment of the optical measurement device of the present disclosure and the surface roughness measurement device 1B according to the second embodiment are both not limited to the specific examples described in detail above, and various modifications are possible.

Figure 18:
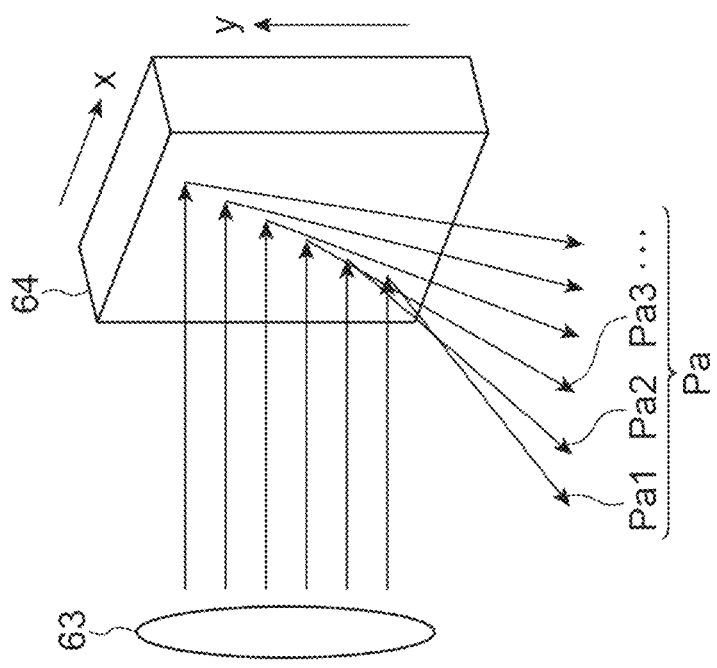
FIG. 18 is a diagram illustrating an example of a configuration of a two-dimensional spectroscope of a distance measurement device according to a first modification of the first embodiment.
Figure 18:
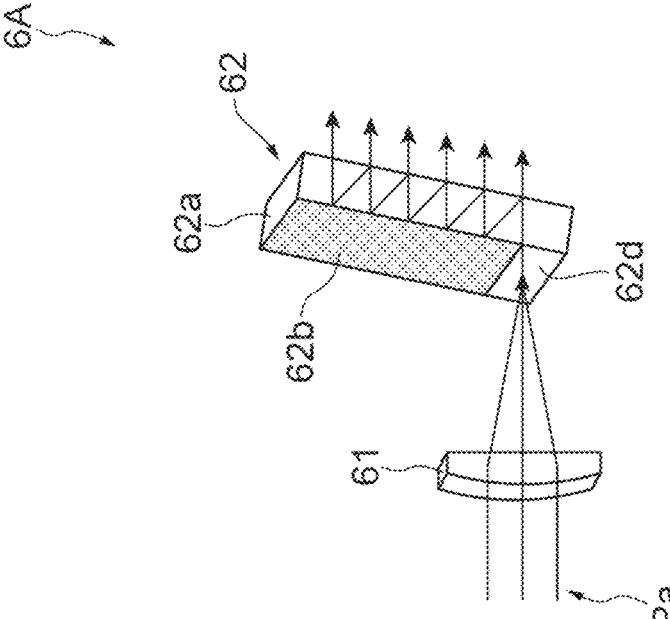

FIG. 18 is a diagram illustrating an example of a configuration of a two-dimensional spectroscope 6A used in place of the diffraction grating 6 in a distance measurement device according to a first modification of the first embodiment. The two-dimensional spectroscope 6A includes a cylindrical lens 61, a virtually imaged phased array (VIPA) plate 62, a lens 63, and a diffraction grating 64. An Echelon grating may be used instead of the VIPA plate 62.

The plurality of measurement light pulses Pa formed by the pulse forming unit 4 pass through the beam splitter 5 (FIG. 1) and are incident on the cylindrical lens 61. The cylindrical lens 61 condenses the plurality of measurement light pulses Pa and causes the plurality of measurement light pulses Pa to be incident on the VIPA plate 62. A spatial shape of the plurality of measurement light pulses Pa condensed by the cylindrical lens 61 is a straight line extending in a direction x of a bus of the cylindrical lens 61.

Figure 19:
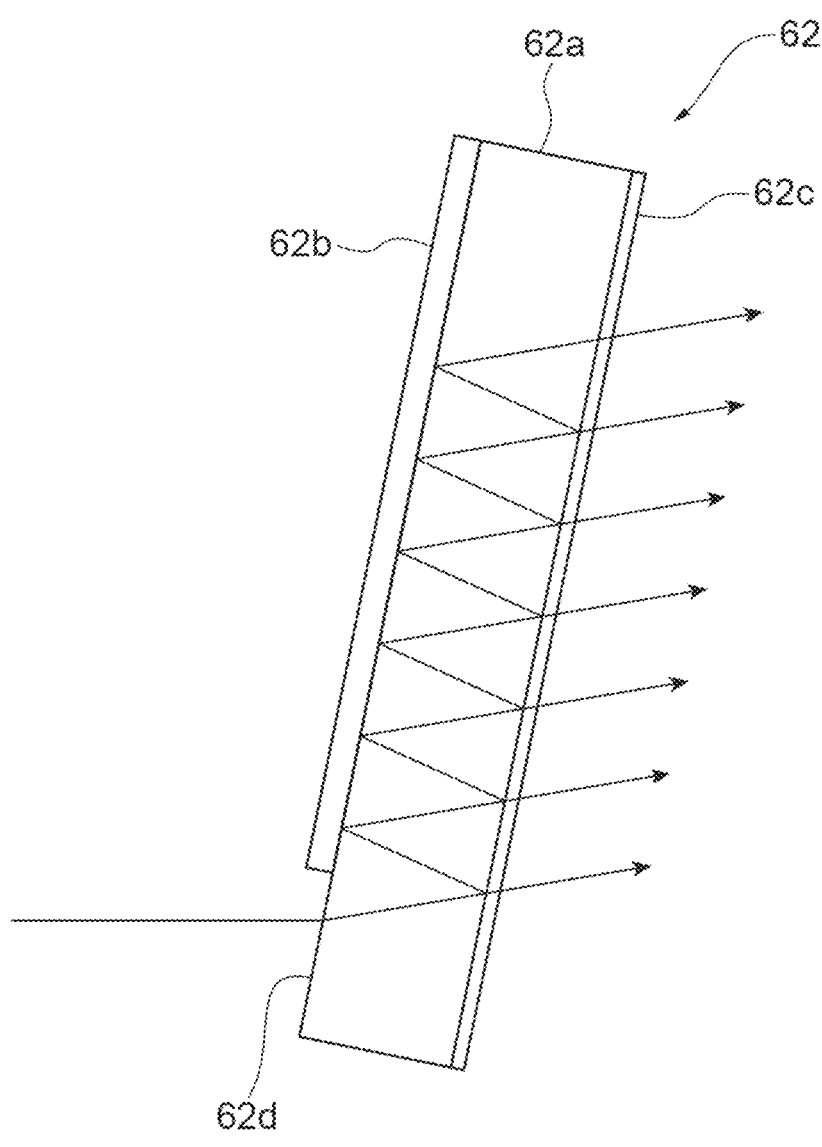
FIG. 19 is a side view illustrating a structure of a VIPA plate of the distance measurement device according to the first modification of the first embodiment.

FIG. 19 is a side view illustrating a structure of the VIPA plate 62. The VIPA plate 62 includes a glass substrate 62a in which one surface is parallel to the other surface, a completely reflective film 62b formed on the one surface of the glass substrate 62a, and a partially reflective film 62c formed on the other surface of the glass substrate 62a. A reflectance of the completely reflective film 62b is 100%, and a reflectance of the partially reflective film 62c is smaller than 100% (for example, 99%). A light incidence region 62d in which the completely reflective film 62b is not formed is provided along one side of the glass substrate 62a on the one surface of the glass substrate 62a.

FIG. 18 will be referred to again. The plurality of measurement light pulses Pa condensed by the cylindrical lens 61 are incident on the VIPA plate 62 in the light incidence region 62d, and are multiple-reflected between the completely reflective film 62b and the partially reflective film 62c. The plurality of measurement light pulses Pa are spectrally separated in a direction in which a straight line that is a spatial shape thereof extends, that is, a direction y orthogonal to a direction x of the bus of the cylindrical lens as a result of interference of light that occurs during the multiple reflection, pass through a partially reflective film 61c, and are emitted from the VIPA plate 62. The light emitted from the VIPA plate 62 includes a plurality of wavelength components, and a frequency interval of the plurality of wavelength components is determined by an emission direction and a thickness of the glass substrate 62a, in other words, an interval between the completely reflective film 62b and the partially reflective film 62c.

The lens 63 condenses the plurality of measurement light pulses Pa spectrally separated by the VIPA plate 62 and causes the plurality of measurement light pulses Pa to be incident on the diffraction grating 64. The diffraction grating 64 spectrally separates the plurality of measurement light pulses Pa in the direction x of the bus of the cylindrical lens 61 and causes the plurality of measurement light pulses Pa to be incident on the lens 7 (see FIG. 1). As a result, the plurality of measurement light pulses Pa are spatially separated in two directions including the direction x of the bus of the cylindrical lens 61 and the direction y orthogonal to the direction x. The lens 7 condenses each of the measurement light pulses Pa1, Pa2, and Pa3 spatially separated from each other in the two directions and radiates the measurement light pulses Pa1, Pa2, and Pa3 onto the surface of the object 100 in different positions. The two-dimensional spectroscope 6A and the lens 7 form a light separator unit which spatially separates the measurement light pulses Pa1, Pa2, and Pa3 included in the plurality of measurement light pulses Pa from each other for each center wavelength and causes the measurement light pulses Pa1, Pa2, and Pa3 to be incident on the object 100.

In the distance measurement device 1A according to the first embodiment, the diffraction grating 6 and the lens 7 are shared between both of the light separator unit which spatially separates the measurement light pulses Pa1, Pa2, and Pa3 included in the plurality of measurement light pulses Pa from each other and irradiates the object 100 with the measurement light pulses Pa1, Pa2, and Pa3, and the wave synthesizer unit which condenses and synthesizes the reflected light pulses Pb1, Pb2, and Pb3 with each other and emits the synthesized light pulses as the plurality of reflected light pulses Pb toward the beam splitter 5. However, when the light separator unit includes the two-dimensional spectroscope 6A and the lens 7, an optical system is configured so that each of the measurement light pulses Pa1, Pa2, and Pa3 travel in different optical paths from the reflected light pulses Pb1, Pb2, and Pb3 corresponding thereto, and it is necessary to provide a wave synthesizer unit separately from the light separator unit including the two-dimensional spectroscope 6A and the lens 7.

In the distance measurement device 1A according to the first embodiment, the plurality of measurement light pulses Pa are spatially separated for each wavelength by using the diffraction grating 6. Therefore, the plurality of measurement light pulses Pa are one-dimensionally separated in a spectral direction of the diffraction grating 6. Thus, it is possible to measure a one-dimensional distribution of the distance.

On the other hand, in the distance measurement device according to the first modification using the two-dimensional spectroscope 6A, the plurality of measurement light pulses Pa are two-dimensionally separated in two directions x and y orthogonal to each other. Therefore, it is possible to measure a two-dimensional distribution of the distance.

The distance measurement device according to the first modification using the two-dimensional spectroscope 6A can also be used for measurement of a thickness of an object, measurement of a film thickness, and measurement of a refractive index of the film, similar to the distance measurement device 1A according to the first embodiment. In that case, it is possible to measure a two-dimensional distribution of the thickness of the object, the film thickness, and the refractive index of the film.

In the surface roughness measurement device 1B according to the second embodiment, it is also possible to measure the two-dimensional distribution of the surface roughness by using the two-dimensional spectroscope 6A instead of the diffraction grating 6.

Figure 20:
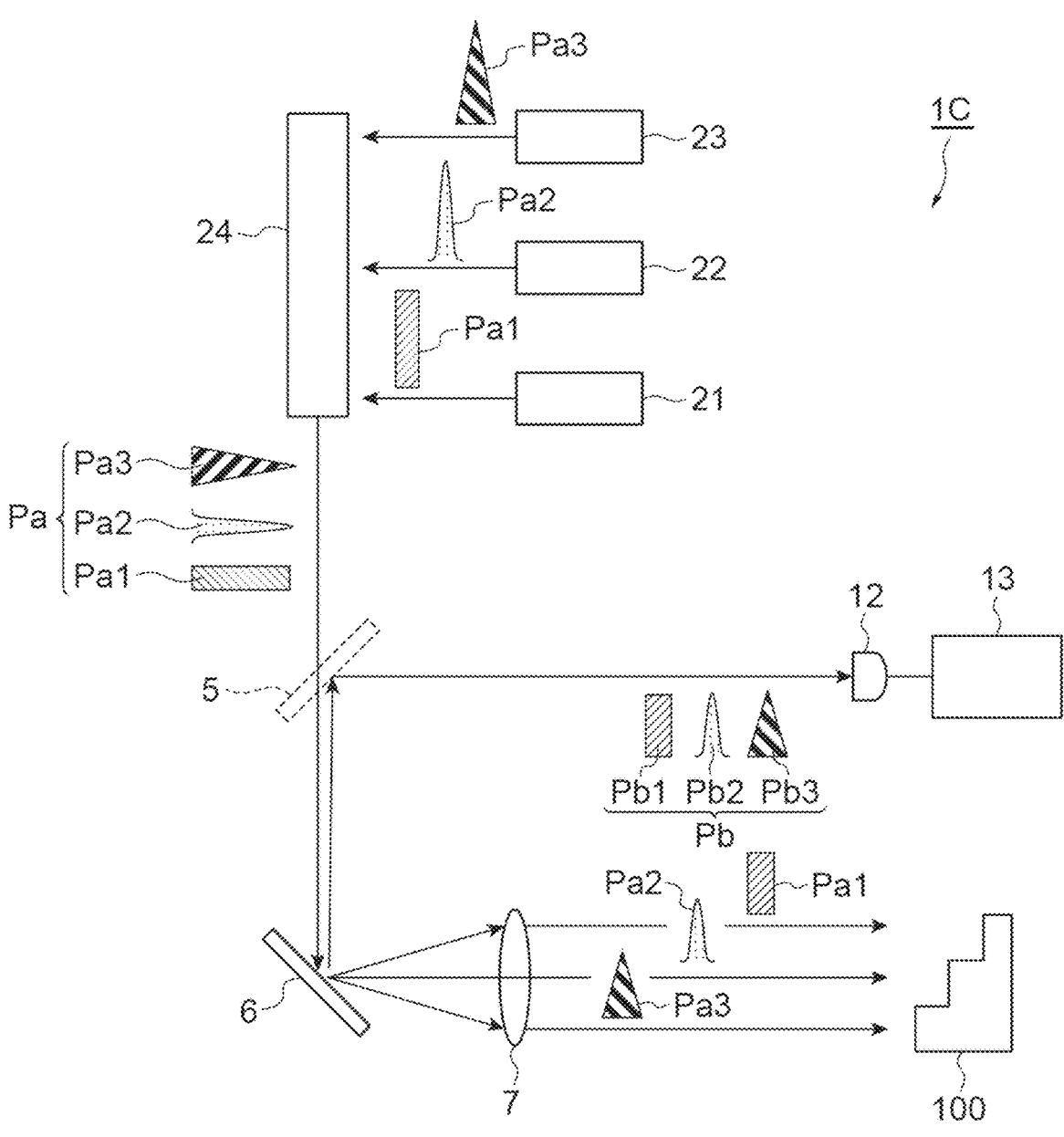
FIG. 20 is a diagram illustrating an example of a configuration of a distance measurement device according to a second modification of the first embodiment.

FIG. 20 is a diagram illustrating an example of a configuration of a distance measurement device 1C according to a second modification of the first embodiment. The distance measurement device 1C includes a plurality of semiconductor laser light sources 21, 22, and 23 having different light emitting wavelengths from each other, a synthesizing optical system 24, a beam splitter 5, a diffraction grating 6, a lens 7, an optical detector 12, and a signal processing device 13, and measures the distance to the object 100 which is a measurement object.

The plurality of semiconductor laser light sources 21, 22, and 23 output measurement light pulses Pa1, Pa2, and Pa3 having different temporal waveforms at different timings from each other. Control of an output timing and a temporal waveform of each of the measurement light pulses Pa1, Pa2, and Pa3 is performed by controlling a drive current supplied to each of the plurality of semiconductor laser light sources 21, 22, and 23. The synthesizing optical system 24 synthesizes the measurement light pulses Pa1, Pa2, and Pa3 and emits the synthesized light pulses as the plurality of measurement light pulses Pa toward the beam splitter 5. The synthesizing optical system 24 can be configured by a spectroscopic element such as a diffraction grating or a prism. Further, the synthesizing optical system 24 can also be configured by a dichroic mirror or the like. The plurality of semiconductor laser light sources 21, 22, and 23 and the synthesizing optical system 24 constitute a measurement light pulse source which outputs the plurality of measurement light pulses Pa having different temporal waveforms and different center wavelengths. A pulse width of the plurality of measurement light pulses Pa is 10 ns or more and 10000 ns or less, and is 100 ns in one example. That is, the plurality of measurement light pulses Pa are so-called nanosecond light pulses.

The plurality of measurement light pulses Pa pass through the beam splitter 5 and are incident on the diffraction grating 6. The diffraction grating 6 spatially separates the measurement light pulses Pa1, Pa2, and Pa3 included in the plurality of incident measurement light pulses Pa for each wavelength. The lens 7 condenses each of the measurement light pulses Pa1, Pa2, and Pa3 spatially separated from each other and radiates the measurement light pulses Pa1, Pa2, and Pa3 on the surface of the object 100 in different positions. The diffraction grating 6 and the lens 7 form a light separator unit which spatially separates the measurement light pulses Pa1, Pa2, and Pa3 included in the plurality of measurement light pulses Pa from each other for each center wavelength and causes the measurement light pulses Pa1, Pa2, and Pa3 to be incident on the object 100. Another spectroscopic element such as a prism may be used instead of the diffraction grating 6. A concave mirror may be used instead of the lens 7.

At least parts of the measurement light pulses Pa1, Pa2, and Pa3 radiated onto the surface of the object 100 in different positions are reflected by the surface of the object 100 and become reflected light pulses Pb1, Pb2, and Pb3, respectively. The plurality of reflected light pulses Pb are also nanosecond light pulses.

The lens 7 collects the reflected light pulses Pb1, Pb2, and Pb3 at one point on the diffraction grating 6. The lens 7 functions as a condensing optical system that condenses reflected light pulses Pb1, Pb2, and Pb3. The diffraction grating 6 functions as a synthesizing optical system. The diffraction grating 6 synthesizes the reflected light pulses Pb1, Pb2, and Pb3 and emits the synthesized light pulses as the plurality of reflected light pulses Pb toward the beam splitter 5. The lens 7 and the diffraction grating 6 form a wave synthesizer unit which condenses and synthesizes the reflected light pulses Pb1, Pb2, and Pb3 with each other and emits the synthesized light pulses as the plurality of reflected light pulses Pb toward the beam splitter 5.

The plurality of reflected light pulses Pb are reflected by the beam splitter 5 and incident on the optical detector 12. The optical detector 12 is, for example, a photodiode or a photomultiplier tube. Since the plurality of reflected light pulses Pb are nanosecond pulses, a temporal change in a light intensity thereof is slower than that of the femtosecond pulse, and can be followed by a response speed of a general optical detector such as a photodiode or a photomultiplier tube. Therefore, it is possible to directly measure the temporal waveforms of the plurality of reflected light pulses Pb using the temporal waveform of the electrical signal output by the optical detector 12 such as a photodiode or a photomultiplier tube. However, in order to accurately evaluate a temporal waveform of the nanosecond light pulse, it is desirable for a response frequency of the optical detector 12 to be 1 GHz or more. The optical detector 12 forms an optical detection unit which receives the plurality of reflected light pulses Pb and outputs a temporal waveform signal thereof. The signal processing device 13 forms a measurement unit which measures timings when the plurality of reflected light pulses Pb are received or a difference between the timings on the basis of the temporal waveform signal of the plurality of reflected light pulses Pb.

In the distance measurement device 1C according to the second modification of the first embodiment, since nanosecond light pulses are used as the plurality of measurement light pulses Pa, it is possible to measure the temporal waveforms of the plurality of reflected light pulses Pb using the optical detector 12 without using an optical sampling technology in which a correlation optical system is used. The pulse width of the measurement light pulse Pa is wider so that distance resolution is degraded, but it is not necessary to provide the correlation optical system, thereby simplifying a configuration of the device. Since it is not necessary to repeat optical sampling in order to measure the temporal waveforms, it is possible to shorten a time required for distance measurement.

Figure 21:
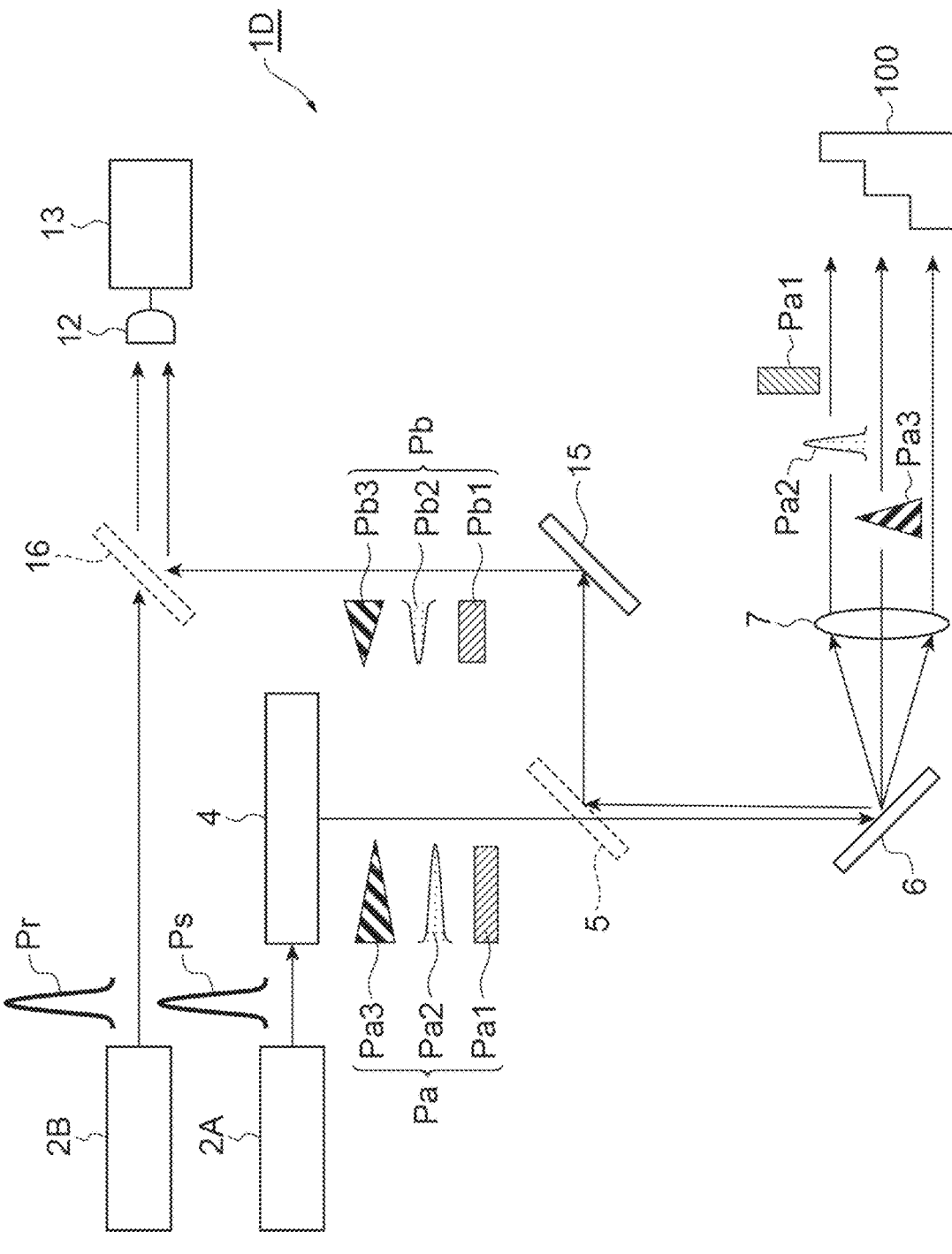
FIG. 21 is a diagram illustrating an example of a configuration of a distance measurement device according to a third modification of the first embodiment.

FIG. 21 is a diagram illustrating an example of a configuration of a distance measurement device 1D according to a third modification of the first embodiment. The distance measurement device 1D differs from the distance measurement device 1A according to the first embodiment in that a dual-coin spectroscopy technology is used. The distance measurement device 1D includes a first pulsed laser light source 2A, a second pulsed laser light source 2B, a pulse forming unit 4, a beam splitter 5, a diffraction grating 6, a lens 7, a reflective mirror 15, a beam splitter 16, an optical detector 12, and a signal processing device 13, and measures the distance to the object 100 which is a measurement object.

The first pulsed laser light source 2A and the second pulsed laser light source 2B are both optical frequency comb light sources in which a pulse period and an offset frequency are stabilized, and periodically output a femtosecond light pulse including mode groups arranged at the same frequency intervals, that is, comb mode groups. The first pulsed laser light source 2A and the second pulsed laser light source 2B have synchronized phases and have slightly different periods in which the femtosecond light pulse is output. The first pulsed laser light source 2A outputs the wideband measurement light pulse Ps, and the second pulsed laser light source 2B outputs the reference light pulse Pr.

The wideband measurement light pulse Ps output by the first pulsed laser light source 2A is incident on the pulse forming unit 4. The pulse forming unit 4 forms the plurality of measurement light pulses Pa from the wideband measurement light pulses Ps. The plurality of measurement light pulses Pa have different temporal waveforms and different center wavelengths. Since the configuration of the pulse forming unit 4 is the same as that of the distance measurement device 1A according to the first embodiment, description thereof will be omitted. The first pulsed laser light source 2A and the pulse forming unit 4 constitute a measurement light pulse source which outputs the plurality of measurement light pulses Pa having different temporal waveforms and different center wavelengths.

The plurality of measurement light pulses Pa pass through the beam splitter 5 and are incident on the diffraction grating 6. The diffraction grating 6 spatially separates the measurement light pulses Pa1, Pa2, and Pa3 included in the plurality of incident measurement light pulses Pa from each other. The lens 7 condenses each of the measurement light pulses Pa1, Pa2, and Pa3 and radiates the measurement light pulses Pa1, Pa2, and Pa3 onto the surface of the object 100 in different positions. The diffraction grating 6 and the lens 7 form a light separator unit which spatially separates the measurement light pulses Pa1, Pa2, and Pa3 included in the plurality of measurement light pulses Pa from each other for each center wavelength and causes the measurement light pulses Pa1, Pa2, and Pa3 to be incident on the object 100.

At least parts of the measurement light pulses Pa1, Pa2, and Pa3 radiated onto the surface of the object 100 in different positions are reflected by the surface of the object 100 and become reflected light pulses Pb1, Pb2, and Pb3, respectively.

The lens 7 collects the reflected light pulses Pb1, Pb2, and Pb3 at one point on the diffraction grating 6. The lens 7 functions as a condensing optical system that condenses the reflected light pulses Pb1, Pb2, and Pb3. The diffraction grating 6 functions as a synthesizing optical system. The diffraction grating 6 synthesizes the reflected light pulses Pb1, Pb2, and Pb3 and emits the synthesized light pulses as the plurality of reflected light pulses Pb toward the beam splitter 5. The lens 7 and the diffraction grating 6 form a wave synthesizer unit which condenses and synthesizes the reflected light pulses Pb1, Pb2, and Pb3 with each other and emit the synthesized light pulses as the plurality of reflected light pulses Pb toward the beam splitter 5.

The plurality of reflected light pulses Pb are reflected by the beam splitter 5 and the reflective mirror 15 and incident on the beam splitter 16. On the other hand, the reference light pulse Pr output by the second pulsed laser light source 2B is also incident on the beam splitter 16. The plurality of reflected light pulses Pb are reflected by the beam splitter 16. The reference light pulse Pr passes through the beam splitter 16. The plurality of reflected light pulses Pb and reference light pulse Pr are condensed together by a lens (not illustrated) and incident on the optical detector 12. At that time, the plurality of reflected light pulses Pb and the reference light pulse Pr interfere with each other and become interference light. The optical detector 12 receives the interference light, converts the interference light into an electrical signal, and outputs the electrical signal. The interference light between the plurality of reflected light pulses Pb and the reference light pulse Pr is correlated light including a cross-correlation between both of them. The reflective mirror 15 and the beam splitter 16 constitute a correlation optical system which outputs correlated light including a cross-correlation between the plurality of reflected light pulses Pb and the reference light pulse Pr.

Here, both the first pulsed laser light source 2A and the second pulsed laser light source 2B periodically output femtosecond light pulses, and the periods slightly differ from each other. Because of that, there is a difference between the timing when the plurality of reflected light pulses Pb are incident on the beam splitter 16 and the timing when the reference light pulse Pr is incident on the beam splitter 16, and the difference changes with time. The optical detector 12 sequentially outputs an electrical signal indicating an intensity of correlated light including a cross-correlation between the plurality of reflected light pulses Pb and the reference light pulse Pr while changing a temporal delay of the reference light pulse Pr with respect to the plurality of reflected light pulses Pb. Accordingly, it is possible to sequentially acquire an electrical signal corresponding to an optical signal obtained by sampling the temporal waveforms of the plurality of reflected light pulses Pb at different timings. The signal processing device 13 measures the temporal waveforms of the plurality of reflected light pulses Pb by processing the electrical signals sequentially acquired in this way.

The correlation optical system including the reflective mirror 15 and the beam splitter 16, the optical detector 12, and the signal processing device 13 constitute an optical detection unit which receive the plurality of reflected light pulses Pb and output a temporal waveform signal thereof. Further, the signal processing device 13 constitutes a measurement unit which measures timings when the plurality of reflected light pulses Pb are received or a difference between the timings on the basis of the temporal waveform signal of the plurality of reflected light pulses Pb.

In the distance measurement device 1A according to the first embodiment, it is necessary to move the moving reflective mirror 8 mounted on the moving stage and change an optical path length of the reference light pulse Pr, in other words, a time delay in order to sample the temporal waveforms of the plurality of reflected light pulses Pb. Since an amount of movement and a moving speed of the moving reflective mirror 8 are limited, a dynamic range of distance measurement and a time required for distance measurement are also limited.

On the other hand, in the distance measurement device 1D according to the third modification of the first embodiment, since a moving reflective mirror is not used, it is possible to expand a dynamic range of the distance measurement and shorten the time required for distance measurement as compared with the distance measurement device 1A.

Figure 22:
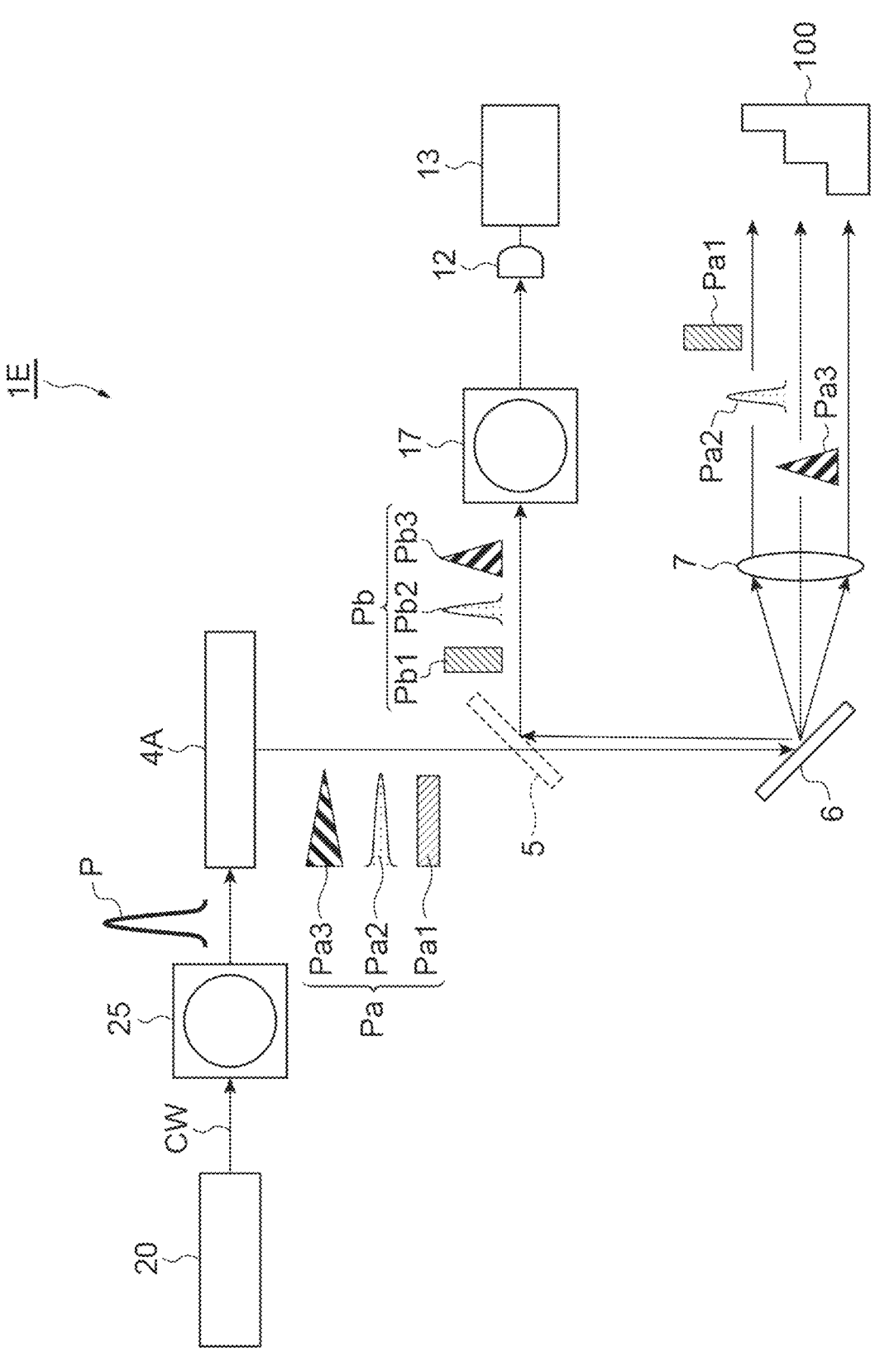
FIG. 22 is a diagram illustrating an example of a configuration of a distance measurement device according to a fourth modification of the first embodiment.

FIG. 22 is a diagram illustrating an example of a configuration of the distance measurement device 1E according to a fourth modification of the first embodiment. The distance measurement device 1E includes a continuous wave laser light source 20, a micro ring resonator 25, a pulse forming unit 4A, a beam splitter 5, a diffraction grating 6, a lens 7, a micro ring resonator 17, an optical detector 12, and a signal processing device 13. The distance measurement device 1E measures the distance to the object 100 which is a measurement object.

The continuous wave laser light source 20 outputs continuous wave laser light CW. The continuous wave laser light CW output by the continuous wave laser light source 20 passes through the micro ring resonator 25 so that pulsed laser light can be oscillated. The pulsed laser light generated thereby is, for example, a femtosecond light pulse. The micro ring resonator 25 periodically outputs the femtosecond light pulse generated in this manner as the wideband light pulse P, and causes the wideband light pulse P to be incident on the pulse forming unit 4A. The pulse forming unit 4A forms the plurality of measurement light pulses Pa from the wideband light pulse P. The plurality of measurement light pulses Pa have different temporal waveforms and different center wavelengths. The continuous wave laser light source 20, the micro ring resonator 25, and the pulse forming unit 4A constitute a measurement light pulse source that outputs the plurality of measurement light pulses Pa having different temporal waveforms and different center wavelengths.

Figure 23:
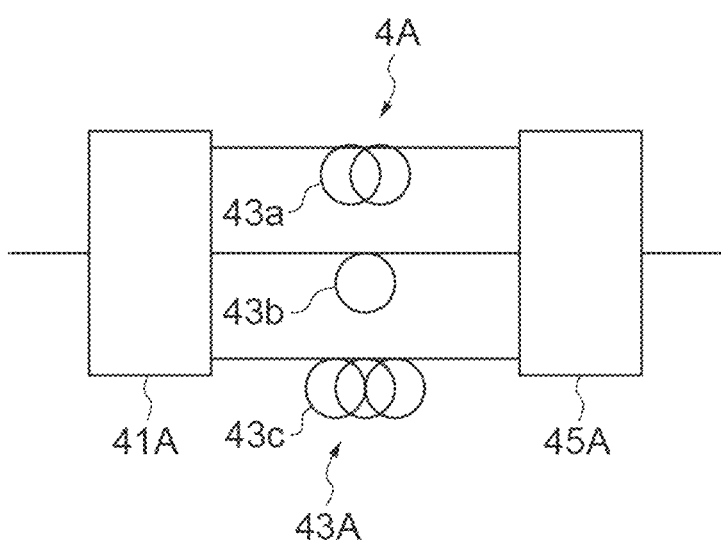
FIG. 23 is a diagram illustrating an example of a configuration of a pulse forming unit of the distance measurement device according to the fourth modification of the first embodiment.

FIG. 23 is a diagram illustrating an example of a configuration of the pulse forming unit 4A. The pulse forming unit 4A includes an array waveguide diffraction grating 41A, a plurality of optical fibers 43A, and an array waveguide diffraction grating 45A. The array waveguide diffraction grating 41A is a spectroscopic element and is optically coupled to the micro ring resonator 25. The array waveguide diffraction grating 41A spatially separates a plurality of wavelength components included in the wideband light pulse P for each wavelength, and causes each wavelength component to be incident on each of the plurality of optical fibers 43A. In FIG. 23, only three optical fibers 43a, 43b, and 43c are shown as the plurality of optical fibers 43A. However, the number of plurality of optical fibers is not limited to 3 and can be any number.

The plurality of optical fibers 43A differ from each other in at least one of the length and the refractive index. Each wavelength component is delayed by a different amount depending on a difference in length of the plurality of optical fibers 43A. As each wavelength component propagates through each of the plurality of optical fibers 43A, a shape of the pulse changes. Since the plurality of optical fibers 43A have different refractive indexes, dispersions of light propagating through the plurality of optical fibers 43A also differs from each other. Therefore, changes in a shape of pulses generated while respective wavelength components propagate through the plurality of optical fibers 43A also differ from each other. Using the fact that the plurality of wavelength components emitted from the array waveguide diffraction grating 41A are delayed by different amounts and changes in pulse shapes of the respective wavelength components differ from each other, it is possible to convert the wideband light pulse P into a plurality of measurement light pulses Pa. The plurality of optical fibers 43A are, for example, dispersion compensating fibers or photonic crystal fibers.

Each wavelength component which has passed through each of the plurality of optical fibers 43A is incident on the array waveguide diffraction grating 45A. The array waveguide diffraction grating 45A synthesizes the wavelength components which have passed through the plurality of optical fibers 43A and emits the synthesized wavelength components as the plurality of measurement light pulses Pa.

The continuous wave laser light source 20, the micro ring resonator 25, and the pulse forming unit 4A constitute a measurement light pulse source which outputs the plurality of measurement light pulses Pa having different time wavelengths and different center wavelengths.

FIG. 22 will be referred to again. The plurality of measurement light pulses Pa formed by the pulse forming unit 4A pass through the beam splitter 5 and are incident on the diffraction grating 6. The diffraction grating 6 spatially separates the measurement light pulses Pa1, Pa2, and Pa3 included in the plurality of incident measurement light pulses Pa for each wavelength. The lens 7 condenses each of the measurement light pulses Pa1, Pa2, and Pa3 spatially separated from each other and radiates the measurement light pulses Pa1, Pa2, and Pa3 onto the surface of the object 100 in different positions. The diffraction grating 6 and the lens 7 form a light separator unit which spatially separates the measurement light pulses Pa1, Pa2, and Pa3 included in the plurality of measurement light pulses Pa from each other for each center wavelength and causes the measurement light pulses Pa1, Pa2, and Pa3 to be incident on the object 100.

At least parts of the measurement light pulses Pa1, Pa2, and Pa3 radiated onto the surface of the object 100 in different positions are reflected by the surface of the object 100 and become reflected light pulses Pb1, Pb2, and Pb3, respectively.

The lens 7 collects the reflected light pulses Pb1, Pb2, and Pb3 at one point on the diffraction grating 6. The lens 7 functions as a condensing optical system that condenses the reflected light pulses Pb1, Pb2, and Pb3. The diffraction grating 6 functions as a synthesizing optical system. The diffraction grating 6 synthesizes the reflected light pulses Pb1, Pb2, and Pb3 and emits the synthesized light pulses as the plurality of reflected light pulses Pb toward the beam splitter 5. The lens 7 and the diffraction grating 6 form a wave synthesizer unit in which the reflected light pulses Pb1, Pb2, and Pb3 are condensed and synthesized with each other and emitted as the plurality of reflected light pulses Pb toward the beam splitter 5.

The plurality of reflected light pulses Pb are reflected by the beam splitter 5 and are incident on the micro ring resonator 17. The plurality of reflected light pulses Pb interfere with each other in the micro ring resonator 17, become interference light, and are emitted from the micro ring resonator 17. The optical detector 12 receives the interference light, converts the interference light into an electrical signal, and outputs the electrical signal. The interference light between the plurality of reflected light pulses Pb is correlated light including autocorrelation among the plurality of reflected light pulses Pb. The micro ring resonator 17 forms a correlation optical system that outputs correlated light including the autocorrelation among the plurality of reflected light pulses Pb.

The temporal waveform of the electrical signal output by the optical detector 12 is a temporal waveform of the correlated light including the autocorrelation among the plurality of reflected light pulses Pb. The signal processing device 13 measures the temporal waveforms of the plurality of reflected light pulses Pb on the basis of the temporal waveform of the electrical signal output by the optical detector 12.

The micro ring resonator 17, the optical detector 12, and the signal processing device 13 constitutes an optical detection unit which receives the plurality of reflected light pulses Pb and outputs a temporal waveform signal thereof. The signal processing device 13 constitutes a measurement unit which measures timings when the plurality of reflected light pulses Pb are received or a difference between the timings on the basis of the temporal waveform signal of the plurality of reflected light pulses Pb.

In the distance measurement device 1E according to the fourth modification of the first embodiment, the moving reflective mirror is not used as in the distance measurement device 1D according to the third modification. Therefore, it is possible to expand a dynamic range of the distance measurement and to shorten a time required for the distance measurement, as compared with the distance measurement device 1A. In addition, in the distance measurement device 1E according to the fourth modification, there is no need for a complicated operation, such as synchronizing phases of two pulsed laser light sources or making periods of femtosecond light pulses output periodically by the respective pulsed laser light sources slightly different, unlike the distance measurement device 1D according to the third modification, even though a dual-coin spectroscopy technology is used.

In the optical measurement device of the present disclosure, the reflected light pulses Pb1, Pb2, and Pb3 included in the plurality of reflected light pulses Pb are identified on the basis of respective temporal waveforms thereof. For example, when feature points of the measurement light pulses Pa1, Pa2, and Pa3 included in the plurality of measurement light pulses Pa are extracted in advance, it is possible to identify the temporal waveforms of the light pulses Pb1, Pb2, and Pb3 appearing in the temporal waveforms of the plurality of reflected light pulses Pb on the basis of the feature points.

Thus, in the optical measurement device of the present disclosure, the respective pulses are identified on the time axis so that it is possible to measure timings when the respective pulses are received or a difference between the timings.

Apart from that, it is also possible to measure the timings when the respective pulses are received or the difference between the timings on the basis of a spectrum obtained by Fourier transform on the temporal waveforms of the plurality of reflected light pulses Pb.

Figure 24A:
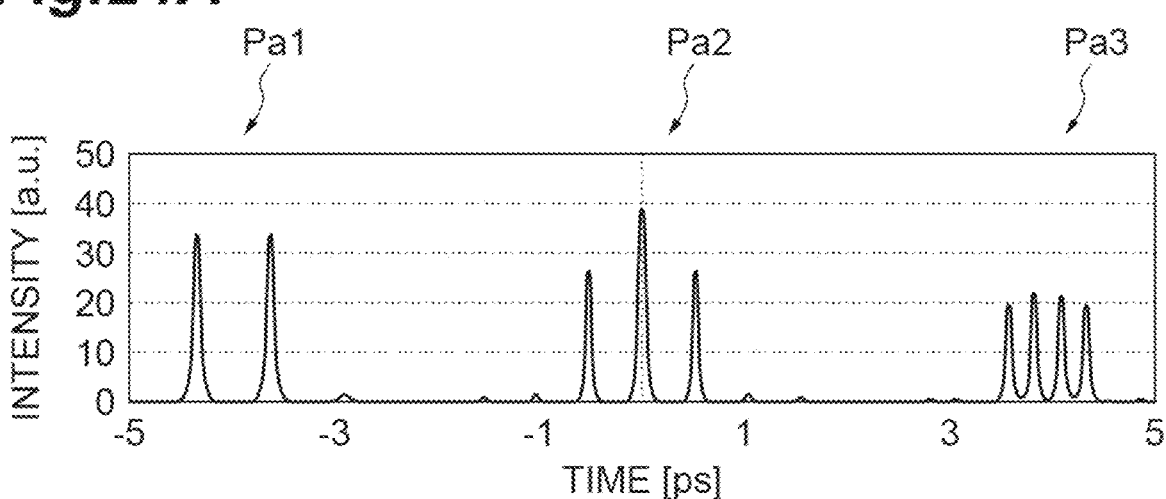
FIGS. 24A and 24B are diagrams illustrating examples of temporal waveforms of pulse trains including a plurality of pulses having different temporal waveforms.
Figure 24B:
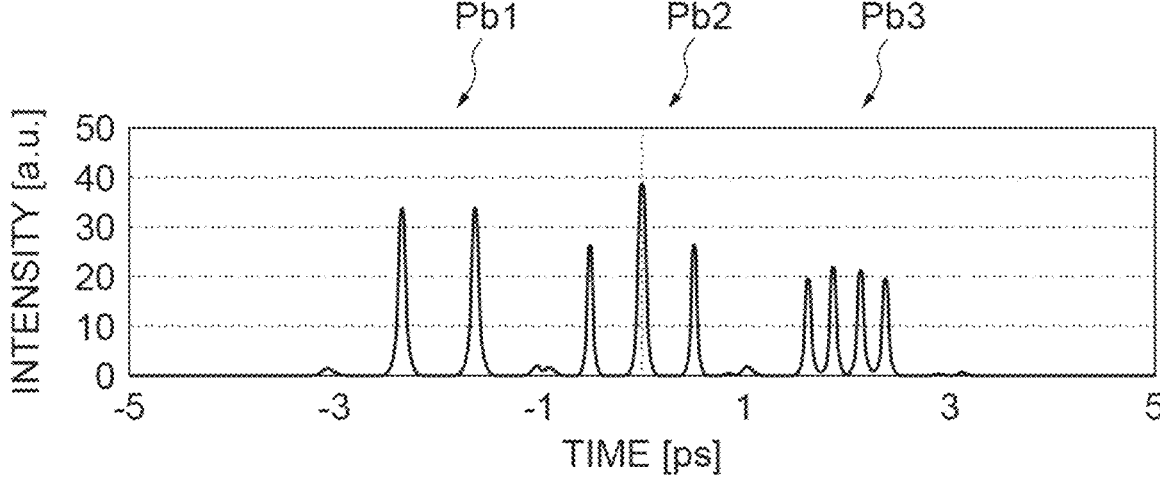

FIGS. 24A and 24B are diagrams illustrating examples of temporal waveforms of pulse trains including a plurality of pulses having different temporal waveforms. In each of FIGS. 24A and 24B, a pulse train including three pulses in which a plurality of single pulses are included and the number of successive single pulses differs from each other, that is, a double pulse, a triple pulse, and a quadruple pulse is shown as the pulse train including the plurality of pulses having different temporal waveforms. FIG. 24A is a diagram illustrating an example of temporal waveforms of the double pulse, the triple pulse, and the quadruple pulse, which are measurement light pulses Pa1, Pa2, and Pa3 included in the plurality of measurement light pulses Pa. FIG. 24B is a diagram illustrating the double pulse, triple pulse, and the quadruple pulse which are the reflected light pulses Pb1, Pb2, and Pb3 included in the plurality of reflected light pulses Pb. Intervals between the reflected light pulses Pb1, Pb2, and Pb3 included in the plurality of reflected light pulses Pb are smaller than intervals between the measurement light pulses Pa1, Pa2, and Pa3 included in the plurality of measurement light pulses Pa.

Figure 25:
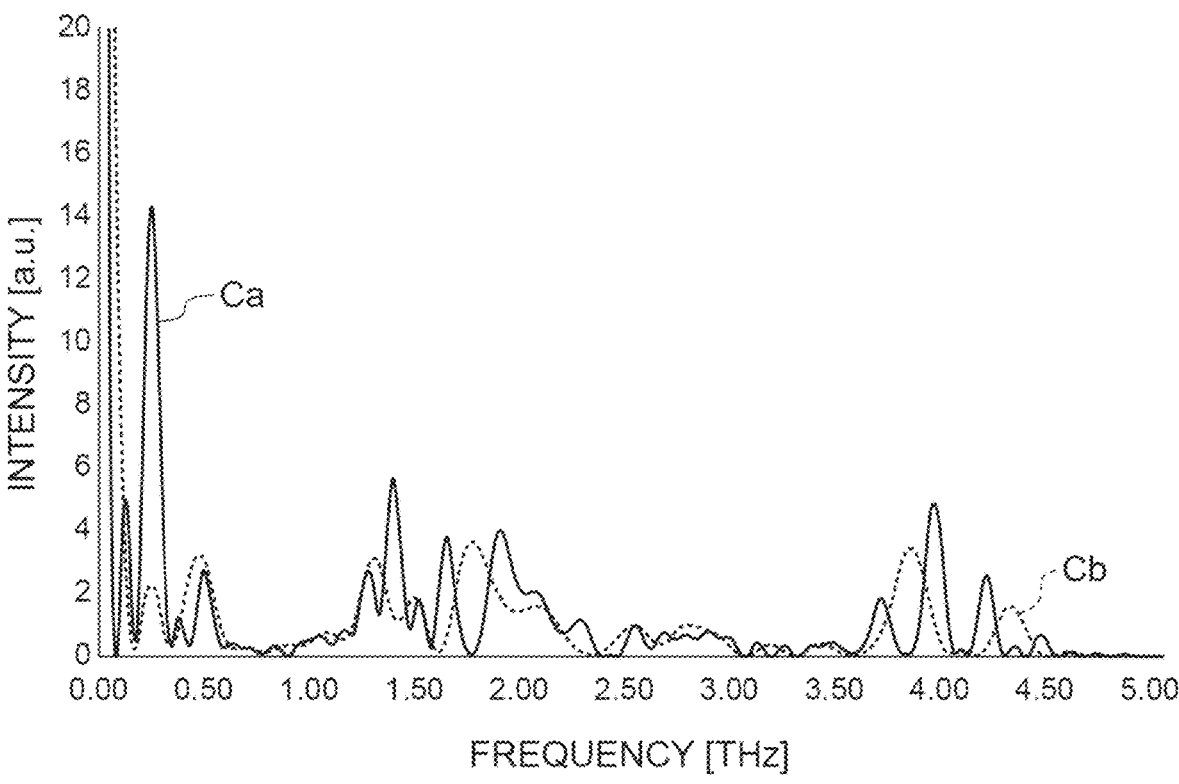
FIG. 25 is a diagram illustrating an example of a spectrum obtained by Fourier transform on an example of the temporal waveform of the pulse train including a plurality of pulses having different temporal waveforms.

FIG. 25 is a diagram illustrating an example of a spectrum obtained by Fourier transform on the temporal waveform illustrated in FIG. 24B. A curve Ca is a spectrum of the temporal waveform of the plurality of measurement light pulses Pa, and a curve Cb is a spectrum of the temporal waveforms of the plurality of reflected light pulses Pb. A difference occurs between the two curves Ca and Cb, which reflects that the interval of each pulse included in the plurality of reflected light pulses Pb is smaller than the interval of each pulse included in the plurality of measurement light pulses Pa. Thus, the temporal waveforms are measured for the plurality of measurement light pulses Pa and the plurality of reflected light pulses Pb, and spectra obtained by Fourier transform on the temporal waveforms are compared with each other, so that a change in order and interval of individual pulses generated between the plurality of measurement light pulses Pa and the plurality of reflected light pulses Pb can be calculated.

In the optical measurement device and the optical measurement method according to the present disclosure described above, the plurality of measurement light pulses having different temporal waveforms are incident on the measurement object. Therefore, it is possible to identify the individual measurement light pulses appearing in the temporal waveform signal obtained by receiving the plurality of measurement light pulses reflected by the measurement object or transmitted through the measurement object from each other regardless of an order in which the measurement light pulses appear. Even when an order of the measurement light pulses is changed or the measurement light pulses overlap between emission of the measurement light pulses and detection of the measurement light pulses, it is possible to correctly identify at which timing the detected measurement light pulse corresponds to a measurement light pulse emitted. Therefore, it is possible to correctly perform the measurement using the measurement light pulses.

In the optical measurement device, the plurality of measurement light pulses before being incident on the measurement object may have a time interval to form a measurement light pulse train. In this case, it is possible to easily form a plurality of measurement light pulses.

In the optical measurement device, the measurement light pulse source may include a plurality of pulsed laser light sources which output light pulses having different temporal waveforms and different center wavelengths, and a synthesizing optical system which synthesizes light pulses output by the plurality of pulsed laser light sources and outputs the synthesized light pulses as a plurality of measurement light pulses. In this case, it is possible to easily form a plurality of measurement light pulses having different temporal waveforms and different center wavelengths using a general pulsed laser light source.

In the optical measurement device, the plurality of pulsed laser light sources may be a plurality of semiconductor laser light sources having different light emitting wavelengths, and drive currents supplied to the plurality of semiconductor laser light sources may differ from each other so that the temporal waveforms of the light pulses output by the plurality of semiconductor laser light sources may differ from each other. In this case, it is possible to easily form a plurality of measurement light pulses having different temporal waveforms and different center wavelengths using a semiconductor laser light source, which is a general laser light source. Further, it is possible to easily measure the temporal waveforms of the plurality of measurement light pulses using a general optical detector such as a photodiode or a photomultiplier tube.

In the optical measurement device, the measurement light pulse source may include a first pulsed laser light source which outputs a wideband light pulse having a plurality of wavelength components, and a pulse forming unit which forms the plurality of measurement light pulses from the wideband light pulse. In this case, since a plurality of measurement light pulses having a full width at half maximum on the order of femtoseconds can be easily formed, it is possible to improve the measurement resolution.

In the optical measurement device, the pulse forming unit may include a spectroscopic element, a spatial light modulator, and a synthesizing optical system. The spectroscopic element spatially separates the plurality of wavelength components included in the wideband light pulse for each wavelength. The spatial light modulator modulates at least one of a phase and an intensity of each of the plurality of wavelength components spatially separated for each wavelength so that a plurality of light pulses having different temporal waveforms and center wavelengths are formed when the plurality of wavelength components are synthesized. The synthesizing optical system synthesizes the plurality of wavelength components that at least one of the phase and the intensity of the wavelength components having been modulated, and outputs the synthesized wavelength components as the plurality of measurement light pulses. In this case, since the phase and intensity of the plurality of wavelength components included in the wideband light pulse can be accurately modulated, it is possible to easily form a plurality of measurement light pulses having different temporal waveforms and different center wavelengths.

In the optical measurement device, the optical detection unit may include a correlation optical system and an optical detector. The correlation optical system receives the plurality of measurement light pulses emitted from the wave synthesizer unit and a reference light pulse and outputs correlated light including a cross-correlation between the plurality of measurement light pulses and the reference light pulse. The optical detector receives the correlated light and outputs a correlated signal. The correlation optical system may output the correlated light by superimposing the plurality of measurement light pulses on the reference light pulse while changing an amount of time delay of the reference light pulse with respect to the plurality of measurement light pulses. The optical detection unit may generate and output the temporal waveform signal on the basis of the correlated signal obtained for each amount of time delay. In this case, since the temporal waveform of the plurality of measurement light pulses having a full width at half maximum on the order of femtoseconds can be measured by using the cross-correlation between the plurality of measurement light pulses and the reference light pulse, it is possible to improve measurement resolution by using a plurality of measurement light pulses having the full width at half maximum on the order of femtoseconds.

In the optical measurement device, the correlation optical system may include a beam splitter, a moving reflective mirror, and an optical element. The beam splitter splits a part of the wideband light pulse output by the first pulsed laser light source from the wideband light pulse to obtain the reference light pulse. The moving reflective mirror changes an amount of time delay of the reference light pulse. The optical element superimposes the plurality of measurement light pulses on the reference light pulse to generate the correlated light. In this case, since the reference light pulse can be easily obtained, it is possible to easily obtain the correlated light including the cross-correlation between the plurality of measurement light pulses and the reference light pulse.

In the optical measurement device, the optical element may include a nonlinear optical crystal. In this case, it is possible to easily obtain correlated light including the cross-correlation between the plurality of measurement light pulses and the reference light pulse using the second harmonic generated in the nonlinear optical crystal.

In the optical measurement device, the first pulsed laser light source may be an optical frequency comb light source. In this case, precise measurement using an optical frequency comb becomes possible.

In the optical measurement device, the optical detection unit may include a correlation optical system and an optical detector. The correlation optical system receives the plurality of measurement light pulses emitted from the wave synthesizer unit and a reference light pulse and output correlated light including a cross-correlation between the plurality of measurement light pulses and the reference light pulse. The optical detector receives the correlated light and outputs a correlated signal. The correlation optical system may include a second pulsed laser light source which outputs the reference light pulse. The second pulsed laser light source may be an optical frequency comb light source of which a phase is synchronized with the first pulsed laser light source and a period in which light pulses are output differs from that of the first pulsed laser light source. In this case, since the temporal waveform of the plurality of measurement light pulses having the full width at half maximum on the order of femtoseconds can be measured by using the cross-correlation between the plurality of measurement light pulses and the reference light pulse, it is possible to improve measurement resolution by using the plurality of measurement light pulses having the full width at half maximum on the order of femtoseconds. Further, precise measurement using a dual-coin spectroscopy technology becomes possible. Further, since a moving reflective mirror which changes the amount of time delay of the reference light pulse is not necessary, it is possible to expand a dynamic range of the measurement and shorten a time required for the measurement.

In the optical measurement device, the pulse forming unit includes an array waveguide diffraction grating, a plurality of optical fibers, and an array waveguide diffraction grating. The array waveguide diffraction grating spatially separates a plurality of wavelength components included in the wideband light pulse for each wavelength. The plurality of optical fibers transmit the plurality of wavelength components spatially separated for each wavelength, respectively. The array waveguide diffraction grating synthesizes the plurality of wavelength components transmitted by the plurality of optical fibers and outputs the synthesized wavelength components as the plurality of measurement light pulses. The plurality of optical fibers may differ from each other in at least one of a length and a refractive index. In this case, it is possible to miniaturize the pulse forming unit. Further, since there is no moving portion, it is possible to make the pulse forming unit made robust and stably form a plurality of measurement light pulses.

In the optical measurement device, the pulsed laser light source may include a continuous wave laser light source and a micro ring resonator. The continuous wave laser light source outputs continuous wave laser light. The micro ring resonator receives the continuous wave laser light, converts the continuous wave laser light into the wideband light pulse, and outputs the wideband light pulse. In this case, since the plurality of measurement light pulses having the full width at half maximum on the order of femtoseconds can be stably formed, it is possible to improve the measurement resolution.

In the optical measurement device, the optical detector may include a micro ring resonator which receives the plurality of measurement light pulses and outputs correlated light including autocorrelation. In this case, since the temporal waveforms of the plurality of measurement light pulses having the full width at half maximum on the order of femtoseconds can be measured by using the autocorrelation of the plurality of measurement light pulses, it is possible to improve measurement resolution using the plurality of measurement light pulses having the full width at half maximum on the order of femtoseconds. Further, precise measurement using a dual-coin spectroscopy technology becomes possible. Further, since only one pulsed laser light source is required and the moving reflective mirror which changes the amount of time delay of the reference light pulse is not necessary, it is possible to expand a dynamic range of the measurement and shorten a time required for the measurement.

In the optical measurement device, the optical detection unit may include a photodiode or a photomultiplier tube. In this case, it is possible to perform the measurement using the photodiode or the photomultiplier tube, which is a general optical detector.

In the optical measurement device, the measurement unit includes a Fourier analysis unit and a calculation unit. The Fourier analysis unit performs Fourier analysis on the temporal waveform signal. The calculation unit measures timings when the plurality of measurement light pulses each are received or a difference between the timings in the temporal waveform signal on the basis of a result of the Fourier analysis. In this case, it is possible to measure the timings when the plurality of measurement light pulses each are received by the optical detection unit or the difference between the timings without identifying each of the plurality of measurement light pulses on a time axis.

In the optical measurement device, the light separator unit may include a diffraction grating, and the wave synthesizer unit may include a diffraction grating. In this case, it is possible to easily configure the light separator unit or the wave synthesizer unit by using a diffraction grating which is a general spectroscopic element.

In the optical measurement device, the wave synthesizer unit may synthesize the plurality of measurement light pulses reflected by the measurement object and emit the synthesized light pulses onto one optical path, and the wave synthesizer unit may also serve as the light separator unit. In this case, it is possible to reduce the number of optical elements forming the optical measurement device.

In the optical measurement device, the light separator unit may spatially separate the plurality of measurement light pulses from each other in two directions. In this case, two-dimensional measurement becomes possible.

In the optical measurement device, the measurement unit may calculate at least one of a distance to the measurement object, a thickness of the measurement object, a thickness and refractive index of a film formed on a surface of the measurement object, and a surface roughness of the measurement object on the basis of the timings when the plurality of measurement light pulses each are received by the optical detection unit or the difference between the timings. According to the optical measurement device according to the present disclosure, it is possible to correctly measure such physical quantities.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An optical measurement device comprising:

a measurement light pulse source configured to output a plurality of measurement light pulses having different temporal waveforms and different center wavelengths;

a spectroscopic element or a spectroscope configured to spatially separate the plurality of measurement light pulses for each center wavelength and cause the plurality of measurement light pulses to be incident on a measurement object;

a wave synthesizer unit configured to synthesize the plurality of measurement light pulses reflected by the measurement object or transmitted through the measurement object and emit the plurality of measurement light pulses onto one optical path;

an optical detection unit configured to receive the plurality of measurement light pulses emitted from the wave synthesizer unit and output a temporal waveform signal of the plurality of measurement light pulses; and a measurement unit configured to measure timings when the plurality of measurement light pulses each are received by the optical detection unit or a difference between the timings on a basis of the temporal waveform signal, wherein the measurement light pulse source includes:

a first pulsed laser light source configured to output a wideband light pulse having a plurality of wavelength components; and a pulse forming unit configured to form the plurality of measurement light pulses from the wideband light pulse, wherein the pulse forming unit includes:

a spectroscopic element configured to spatially separate the plurality of wavelength components included in the wideband light pulse for each wavelength;

a spatial light modulator configured to modulate at least one of a phase and an intensity of each of the plurality of wavelength components spatially separated for each wavelength so that a plurality of light pulses having different temporal waveforms and center wavelengths are formed when the plurality of wavelength components are synthesized; and a synthesizing optical system configured to synthesize the plurality of wavelength components, the at least one of the phase and the intensity of the wavelength components having been modulated, and output the plurality of wavelength components as the plurality of measurement light pulses.

2. The optical measurement device according to claim 1, wherein the plurality of measurement light pulses before being incident on the measurement object have a time interval and form a measurement light pulse train.

3. The optical measurement device according to claim 1, wherein the optical detection unit includes a correlation optical system configured to receive the plurality of measurement light pulses emitted from the wave synthesizer unit and a reference light pulse and output correlated light including a cross-correlation between the plurality of measurement light pulses and the reference light pulse; and an optical detector configured to receive the correlated light and output a correlated signal, wherein the correlation optical system outputs the correlated light by superimposing the plurality of measurement light pulses on the reference light pulse while changing an amount of time delay of the reference light pulse with respect to the plurality of measurement light pulses, and the optical detection unit generates and outputs the temporal waveform signal from the correlated signal obtained for each amount of time delay.

4. The optical measurement device according to claim 3, wherein the correlation optical system includes a beam splitter configured to split a part of the wideband light pulse output by the first pulsed laser light source from the wideband light pulse to obtain the reference light pulse;

a moving reflective mirror configured to change an amount of time delay of the reference light pulse; and an optical element configured to superimpose the plurality of measurement light pulses on the reference light pulse to generate the correlated light.

5. The optical measurement device according to claim 4, wherein the optical element includes a nonlinear optical crystal.

6. The optical measurement device according to claim 3, wherein the first pulsed laser light source is an optical frequency comb light source.

7. The optical measurement device according to claim 6, wherein the optical detection unit includes a correlation optical system configured to receive the plurality of measurement light pulses emitted from the wave synthesizer unit and a reference light pulse and output correlated light including a cross-correlation between the plurality of measurement light pulses and the reference light pulse; and an optical detector configured to receive the correlated light and output a correlated signal, wherein the correlation optical system includes a second pulsed laser light source configured to output the reference light pulse, and the second pulsed laser light source is an optical frequency comb light source of which a phase is synchronized with the first pulsed laser light source and a period in which light pulses are output differs from that of the first pulsed laser light source.

8. An optical measurement device comprising:

a measurement light pulse source configured to output a plurality of measurement light pulses having different temporal waveforms and different center wavelengths;

a spectroscopic element or a spectroscope configured to spatially separate the plurality of measurement light pulses for each center wavelength and cause the plurality of measurement light pulses to be incident on a measurement object;

a wave synthesizer unit configured to synthesize the plurality of measurement light pulses reflected by the measurement object or transmitted through the measurement object and emit the plurality of measurement light pulses onto one optical path;

an optical detection unit configured to receive the plurality of measurement light pulses emitted from the wave synthesizer unit and output a temporal waveform signal of the plurality of measurement light pulses; and a measurement unit configured to measure timings when the plurality of measurement light pulses each are received by the optical detection unit or a difference between the timings on a basis of the temporal waveform signal, wherein the measurement light pulse source includes:

a first pulsed laser light source configured to output a wideband light pulse having a plurality of wavelength components; and a pulse forming unit configured to form the plurality of measurement light pulses from the wideband light pulse, wherein the pulse forming unit includes:

a first array waveguide diffraction grating configured to spatially separate a plurality of wavelength components included in the wideband light pulse for each wavelength;

a plurality of optical fibers each configured to transmit the plurality of wavelength components spatially separated for each wavelength; and a second array waveguide diffraction grating configured to synthesize the plurality of wavelength components transmitted by the plurality of optical fibers and output the plurality of wavelength components as the plurality of measurement light pulses, and wherein the plurality of optical fibers differ from each other in a refractive index.

9. The optical measurement device according to claim 8, wherein the first pulsed laser light source includes a continuous wave laser light source configured to output continuous wave laser light; and a micro ring resonator configured to receive the continuous wave laser light, convert the continuous wave laser light into the wideband light pulse, and output the wideband light pulse.

10. The optical measurement device according to claim 9, wherein the optical detection unit includes a micro ring resonator configured to receive the plurality of measurement light pulses and output correlated light including autocorrelation.

11. The optical measurement device according to claim 1, wherein the optical detection unit includes a photodiode or a photomultiplier tube.

12. The optical measurement device according to claim 1, wherein the measurement unit includes a Fourier analysis unit configured to perform Fourier analysis on the temporal waveform signal; and a calculation unit configured to measure timings when the plurality of measurement light pulses each are received by the optical detection unit or a difference between the timings on a basis of a result of the Fourier analysis on the temporal waveform signal.

13. The optical measurement device according to claim 1, wherein the spectroscopic element or the spectroscope includes a diffraction grating.

14. The optical measurement device according to claim 1, wherein the wave synthesizer unit includes a diffraction grating.

15. The optical measurement device according to claim 1, wherein the wave synthesizer unit synthesizes the plurality of measurement light pulses reflected by the measurement object and emits the plurality of measurement light pulses onto one optical path, and wherein the wave synthesizer unit also serves as the spectroscopic element or the spectroscope.

16. The optical measurement device according to claim 1, wherein the spectroscopic element or the spectroscope spatially separates the plurality of measurement light pulses from each other in two directions.

17. The optical measurement device according to claim 1, wherein the measurement unit calculates at least one of a distance to the measurement object, a thickness of the measurement object, a thickness and refractive index of a film formed on a surface of the measurement object, and a surface roughness of the measurement object on a basis of the timings or the difference.

18. An optical measurement method comprising steps of:

outputting a plurality of measurement light pulses having different temporal waveforms and different center wavelengths;

spatially separating the plurality of measurement light pulses for each center wavelength and causing the plurality of measurement light pulses to be incident on a measurement object;

synthesizing the plurality of measurement light pulses reflected by the measurement object or transmitted through the measurement object and emitting the plurality of measurement light pulses onto one optical path;

receiving the plurality of measurement light pulses emitted onto one optical path, and outputting a temporal waveform signal of the plurality of measurement light pulses; and measuring timings when the plurality of measurement light pulses each are received or a difference between the timings on a basis of the temporal waveform signal, wherein the outputting includes:

outputting a wideband light pulse having a plurality of wavelength components; and forming the plurality of measurement light pulses from the wideband light pulse, and wherein the forming includes:

spatially separating the plurality of wavelength components included in the wideband light pulse for each wavelength;

modulating at least one of a phase and an intensity of each of the plurality of wavelength components spatially separated for each wavelength so that a plurality of light pulses having different temporal waveforms and center wavelengths are formed when the plurality of wavelength components are synthesized; and synthesizing the plurality of wavelength components, the at least one of the phase and the intensity of the wavelength components having been modulated, and outputting the plurality of wavelength components as the plurality of measurement light pulses.

19. An optical measurement method comprising steps of:

outputting a plurality of measurement light pulses having different temporal waveforms and different center wavelengths;

spatially separating the plurality of measurement light pulses for each center wavelength and causing the plurality of measurement light pulses to be incident on a measurement object;

synthesizing the plurality of measurement light pulses reflected by the measurement object or transmitted through the measurement object and emitting the plurality of measurement light pulses onto one optical path;

receiving the plurality of measurement light pulses emitted onto one optical path, and outputting a temporal waveform signal of the plurality of measurement light pulses; and measuring timings when the plurality of measurement light pulses each are received or a difference between the timings on a basis of the temporal waveform signal, wherein the outputting includes:

outputting a wideband light pulse having a plurality of wavelength components; and forming the plurality of measurement light pulses from the wideband light pulse, wherein the forming includes:

spatially separating a plurality of wavelength components included in the wideband light pulse for each wavelength; 5 transmitting the plurality of wavelength components spatially separated for each wavelength using a plurality of optical fibers; and synthesizing the plurality of wavelength components 10 transmitted by the plurality of optical fibers and outputting the plurality of wavelength components as the plurality of measurement light pulses, and wherein the plurality of optical fibers differ from each other in a refractive index. 15

* * * * *